United States Patent
Connor et al.

(10) Patent No.: US 10,087,332 B2
(45) Date of Patent: Oct. 2, 2018

(54) SINTERABLE METAL PASTE FOR USE IN ADDITIVE MANUFACTURING

(71) Applicant: NanoCore Technologies, Sunnyvale, CA (US)

(72) Inventors: Stephen T. Connor, San Francisco, CA (US); James R. Groves, Sunnyvale, CA (US); Theodore C. Sorom, San Rafael, CA (US)

(73) Assignee: NANOCORE TECHNOLOGIES, Sunnyvale, CA (US)

( * ) Notice: Subject to any disclaimer, the term of this patent is extended or adjusted under 35 U.S.C. 154(b) by 0 days.

(21) Appl. No.: 15/594,472

(22) Filed: May 12, 2017

(65) Prior Publication Data

US 2017/0327701 A1   Nov. 16, 2017

Related U.S. Application Data

(60) Provisional application No. 62/335,679, filed on May 13, 2016, provisional application No. 62/421,707, filed on Nov. 14, 2016.

(51) Int. Cl.
| | |
|---|---|
| *B22F 1/00* | (2006.01) |
| *C09D 5/38* | (2006.01) |
| *B33Y 70/00* | (2015.01) |
| *B33Y 10/00* | (2015.01) |
| *C09D 133/02* | (2006.01) |
| *C09D 169/00* | (2006.01) |
| *B22F 3/10* | (2006.01) |
| *B22F 3/105* | (2006.01) |
| *B22F 3/24* | (2006.01) |
| *B22F 7/00* | (2006.01) |
| *B22F 7/02* | (2006.01) |
| *C21D 6/00* | (2006.01) |
| *C22F 1/10* | (2006.01) |
| *C22F 1/08* | (2006.01) |
| *C22C 38/58* | (2006.01) |
| *C22C 38/44* | (2006.01) |
| *C22C 38/34* | (2006.01) |
| *C22C 38/02* | (2006.01) |
| *C22C 19/05* | (2006.01) |
| *C22C 27/06* | (2006.01) |
| *C22C 9/08* | (2006.01) |
| *C22C 9/02* | (2006.01) |
| *C22C 11/06* | (2006.01) |

(52) U.S. Cl.
CPC ............ *C09D 5/38* (2013.01); *B22F 1/0014* (2013.01); *B22F 1/0022* (2013.01); *B22F 1/0074* (2013.01); *B22F 3/1017* (2013.01); *B22F 3/1055* (2013.01); *B22F 3/24* (2013.01); *B22F 7/008* (2013.01); *B22F 7/02* (2013.01); *B33Y 10/00* (2014.12); *B33Y 70/00* (2014.12); *C09D 133/02* (2013.01); *C09D 169/00* (2013.01); *C21D 6/004* (2013.01); *C21D 6/005* (2013.01); *C21D 6/007* (2013.01); *C21D 6/008* (2013.01); *C22C 9/02* (2013.01); *C22C 9/08* (2013.01); *C22C 11/06* (2013.01); *C22C 19/056* (2013.01); *C22C 19/058* (2013.01); *C22C 27/06* (2013.01); *C22C 38/02* (2013.01); *C22C 38/34* (2013.01); *C22C 38/44* (2013.01); *C22C 38/58* (2013.01); *C22F 1/08* (2013.01); *C22F 1/10* (2013.01); *B22F 2003/1042* (2013.01); *B22F 2003/1058* (2013.01); *B22F 2003/248* (2013.01); *B22F 2301/10* (2013.01); *B22F 2301/15* (2013.01); *B22F 2301/35* (2013.01); *B22F 2998/10* (2013.01)

(58) Field of Classification Search
None
See application file for complete search history.

(56) References Cited

U.S. PATENT DOCUMENTS

| | | | | |
|---|---|---|---|---|
| 4,552,719 A | * | 11/1985 | Morimoto | ........... C22C 33/0207 419/2 |
| 4,596,746 A | * | 6/1986 | Morishita | ............. B22F 1/0014 419/23 |

(Continued)

FOREIGN PATENT DOCUMENTS

WO    WO 03/084708 A1    10/2003

OTHER PUBLICATIONS

Copenheaver, Blaine R., (PCT Officer), "PCT International Search Report and the Written Opinion of the International Searching Authority," dated Aug. 4, 2017.

*Primary Examiner* — Jessee Randall Roe
*Assistant Examiner* — Ngoclan Thi Mai
(74) *Attorney, Agent, or Firm* — MH2 Technology Law Group, LLP

(57) ABSTRACT

A material and method are disclosed such that the material can be used to form functional metal pieces by producing an easily sintered layered body of dried metal paste. On a microstructural level, when dried, the metal paste creates a matrix of porous metal scaffold particles with infiltrant metal particles, which are positioned interstitially in the porous scaffold's interstitial voids. For this material to realize mechanical and processing benefits, the infiltrant particles are chosen such that they pack in the porous scaffold piece in a manner which does not significantly degrade the packing of the scaffold particles and so that they can also infiltrate the porous scaffold on heating. The method of using this paste provides a technique with high rate and resolution of metal part production due to a hybrid deposition/removal process.

21 Claims, 5 Drawing Sheets

(56) References Cited

U.S. PATENT DOCUMENTS

| | | | |
|---|---|---|---|
| 5,732,323 A * | 3/1998 | Nyrhila | B22F 3/1007 419/2 |
| 6,630,009 B2 | 10/2003 | Moussa et al. | |
| 6,974,656 B2 | 12/2005 | Hinczewski | |
| 8,361,924 B2 | 1/2013 | Tanaka et al. | |
| 2006/0083652 A1 * | 4/2006 | Liu | B22F 1/0003 419/23 |

* cited by examiner

SINTERABLE METAL PASTE FOR USE IN ADDITIVE MANUFACTURING

CROSS-REFERENCE TO RELATED APPLICATIONS

This application claims priority to, and the benefit of, U.S. Provisional Application Nos. 62/335,679 filed May 13, 2016 and 62/421,707 filed Nov. 14, 2016, both of which applications are hereby incorporated by reference in their entireties.

DETAILED DESCRIPTION

Field of the Disclosure

This disclosure relates to materials used in the additive manufacturing of metals. More specifically, several metal paste formulations comprising mixtures of metal,particles with specified particle size distributions and compositions are disclosed. Methods of using these metal pastes to provide substantial improvements in the processing of additive manufacturing of metals are also disclosed.

Background

Additive manufacturing is a rapidly growing field in which material is assembled in a customized manner, producing parts on demand that are otherwise impossible or inconvenient to make. The most common motif for additive manufacturing is deposition of plastic or metal in a layer-by-layer fashion. Each layer is individually shaped by selective mass and energy input. The subfield of metal additive manufacturing holds much promise, particularly in the creation of high-value metal pieces for applications such as prototyping aerospace components, and industrial tooling.

The state of the art in additive manufacturing of metals is the laser melting or sintering of coarse metal powders in a technique typically called "powder bed fusion" (PBF), in this technique, dry metal powder is spread across a build surface (or bed) into a thin but even layer. Subsequently, a high powered laser is moved across the powder bed, only exciting selected regions which melt into the desired shape for a layer. The powder spreading and laser melting steps are then repeated until the desired shape is formed in a layerwise fashion, which shape is buried in the unmelted metal powder.

Most implementations of PBF utilize "coarse" metal particles with diameters typically in the range from 5-30 micrometers and layer thicknesses in the range of 50-100 micrometers. A layer of particles may be as few as two particles thick, introducing the possibility of inhomogeneous pockets of void space and resulting variable materials properties. Prior practitioners teach that such metal powder can be either melted or sintered, depending on the energy of the laser system and the material selection. Melting of coarse metal particles, wherein a region of the metal powder converts into a liquid phase for a time, typically produces metal pieces with low porosity, resulting in high mechanical strength. Conversely, sintering of coarse metal powders, wherein a region of the metal powder is excited sufficiently to partially fuse neighboring metal particles, typically produces metal pieces with lower mechanical strength, although lower power may be employed for sintering than for melting.

The energy employed to melt or sinter a powder depends on the particle size, with smaller particles requiring less energy due to their higher surface area, higher curvature and more mobile surface atoms. To melt coarse powders, the laser typically has a power greater than 1 kW, requiring extensive safety controls to contain such a high power laser beam. Variations and refinements on this technique are known, as shown, for example, in U.S. Pat. No. 5,316,580 (issued to Deckard) and U.S. Pat. No. 8,784,721 (issued to Philippi). The commonality between almost all metal additive manufacturing techniques is the dry metal powder used as a precursor, Metal powders with diameters of less than 10 micrometers are challenging to move to specified locations in a controllable fashion, due to the inherent stickiness and clumping resulting from the increased surface area and correlated interparticle attraction. Metal pastes, which are dispersions of metal powders in a solvent, are known in the art as a means to deposit layers of metal powders with diameters less than 10 micrometers. The addition of the solvent has the effect of screening particles from interparticle attraction. Various additives, such as polymers, can be included in the pastes to allow particles to flow past one another smoothly. Metal pastes have been used in additive manufacturing as shown, for example, in U.S. Pat. No. 6,974,656 (issued to Hinczewski), wherein a metal paste is deposited in a layerwise fashion and further sintered by a multistep process However, metal pastes are rarely used in metal additive manufacturing, such as PBF techniques, due to various challenges in formulating and using the metal pastes.

While laser melting and sintering have both been used to form fully dense, high strength metal pieces from metal powders, there are common drawbacks PBF, such as expensive and complicated equipment, long process times, and inhomogeneous mechanical properties in produced metal parts. Still, these additive manufacturing techniques using melting and sintering can be considered as means to produce dense metal parts from source metal powders. Other techniques have been developed as alternative means of achieving the goal of increased metal part density.

One of these developments is metal infiltration, wherein a molten metal (infiltrant) infiltrates a porous body of metal powder (a scaffold), increasing the density and improving mechanical properties. It is known that several types of scaffolds can be infiltrated by an externally placed ingot of lower melting infiltrant, such as that taught by Taubenblat in U.S. Pat. No. 3,652,261. This technique is used commonly in the field of powder metallurgy. The mechanism of strengthening in infiltration is that a scaffold has interstitial voids that act as crack initiation sites, and filling them with another metal mitigates this failure mechanism.

Typically, three conditions can be met to allow for successful infiltration: 1) The infiltrant metal has a melting point that is lower than that of the scaffold metal so that the liquid infiltrant can contact the solid porous scaffold piece; 2) The infiltrant is in contact with the porous scaffold piece and heated in a manner such that the infiltrant material flows into the porous scaffold piece and distributes homogeneously; and 3) The infiltrant metal does not react with the scaffold metal in err anisotropic manner that would clog pores and prevent flow of infiltrant deeper into the porous scaffold piece or result in inhomogeneous distribution.

Meeting these three conditions imposes many constraints on both the materials that can be used as a scaffold/infiltrant pair and also results in laborious processing conditions. In the most common examples involving scaffold metals comprising iron, the melting point differential condition limits materials selection primarily to copper alloys with melting points between 700-1100 C. Additionally, it may be desirable for the infiltrant to flow distances of from 1 mm-10 cm through pores, which may involve heating the liquid metal infiltrant temperatures well above its melting point to achieve sufficient diffusional velocities so as to complete the infiltration process in feasible time periods of 24-48 hours.

Metal infiltration techniques typically do not utilize layerwise growth, but instead use metal paste casting into a mold. One implementation intended for use in additive manufacturing was previously branded under the term "Keltool," and involved a multistep process wherein a porous iron scaffold is created from pouring metal paste into a mold. Copper alloy material is subsequently melted and flowed into the porous scaffold over the course of 24-48 hours. Such metal infiltration techniques can also be used in concert with metal sintering to dramatically improve mechanical properties of the resulting metal piece. Depending on the materials and processing selection, the sintering and infiltration events can occur sequentially or simultaneously.

SUMMARY

A material and method are disclosed such that the material can be used to form functional metal pieces by producing an easily sintered layered body of dried metal paste. On a microstructural level, when dried, the metal paste creates a matrix of porous metal scaffold particles with infiltrant metal particles, which are positioned it in the porous scaffold's interstitial voids. For this material to realize mechanical and processing benefits, the infiltrant particles are chosen such that they pack in the porous scaffold piece in a manner which does not significantly degrade the packing of the scaffold particles and so that they can also infiltrate the porous scaffold on heating. The method of using this paste provides a technique with high rate and resolution of metal part production due to a hybrid deposition/removal process.

The present disclosure is directed to the following embodiments:
1.01 A metal paste for use in the layerwise growth of metal structures, comprising:
   a vehicle comprising at least a solvent and a polymeric binder;
   metal scaffold particles comprising particles of a structural metal, the metal scaffold particles having a D50 particle size: arid
   metal infiltrant particles with a D50 particle size of less than 1/5 of the D50 particle size of the metal scaffold particles, such that the metal infiltrant particles primarily position in interstitial spaces between the metal scaffold particles.
1.02 The metal paste of 1.01, further comprising an inorganic reactive component,
1.03 The metal paste of 1.01 further comprising an inorganic reinforcing component,
1.04 The metal paste of 1.01, wherein the vehicle comprises a solvent selected from the group consisting of water, ethylene glycol, diethylene glycol, diethylene glycol monobutyl ether, triethylene glycol monobutyl ether, methanol, ethanol, propanol, butanol, pentanol, hexanol, heptanol, octanol, terpineol, texanol butyl ester, mineral spirits, propylene carbonate, pentane, hexane, cyclohexane, heptane, octane, nonane, decane, undecane, dodecane, tridecane, tetradecane, toluene, benzene, xylene, mesitylene, tetrahydrofuran, ethanolamine and N-methylpyrrolidone, dichloromethane, toluene, ketones, dimethylacetamide, acetone, methyl ethyl ketone, cyclohexanone, methyl acetate and n-butyl acetate.
1.05 The metal paste of 1.01 wherein the vehicle comprises at least one binder selected from the group consisting of poly(ethyelene oxide); ethyl cellulose; methyl cellulose; agar; hydroxyethyl cellulose; nitrocellulose, polymethylmethacrylate, polystyrene, polyester, methylacrylate, ethylacrylate, butylacrylate, acrylonitrile copolymer, maleic acid, and maleic acid ester; polyvinyl acetate; polyethylene, polypropylene; polyvinylbutyral; poly(carbonate), poly(acrylic add); rosin; modified rosin; terpene resin; phenolic resin; paraffin wax, ethylene vinyl alcohol, polycaprolactam, and combinations thereof.
1.06 The metal paste of 1.01, wherein the vehicle comprises a binder with a decomposition temperature of approximately 200-350° C., with a residual carbon content of approximately between 0.1 wt %-0.5 wt % of the total metal paste.
1.07 The metal paste of 1.01, wherein the vehicle comprises a binder with a decomposition temperature of 200-250° C., with a residual carbon content <0.5 wt % of the total metal paste, or the vehicle comprises a binder with a decomposition temperature of 250-300° C., with a residual carbon content <0.5 wt % of the total metal paste.
1.08 The metal paste of 1.01, wherein the metal paste has a viscosity between approximately 10,000-1,000,000 cps, such as 50,000-500,000 cps or 100,000-300,000 cps.
1.09 The metal paste of 1.01, wherein the solids loadings is between approximately 50-95 wt %, such as 75-95 wt % or 90-95 wt %, of the total metal paste.
1.10 The metal paste of 1.01. wherein the metal scaffold particles have a D50 between 1 μm and 8 μm and a D90 between 2 μm and 16 μm, such as a D50 between 1 μm and 3 μm and a D90 between 3 μm and 6 μm, a D50 between 1 μm and 5 μm and a D90 between 5 μm and 10 μm or a D50 between 1 μm and 8 μm and a D90 between 8 μm and 16 μm.
1.11 The metal paste of 1.01, wherein the metal scaffold particles comprise a surface ligand selected from the group consisting of oleic acid, octanoic acid, octylamine, triethylamine, ethylenediamine, adipic acid, sebacic acid, poly(acrylic acid), poly(ethylene oxide), ethyl cellulose, methyl cellulose, hydroxyethyl cellulose and nitrocellulose.
1.12 The metal paste of 1.01, wherein the metal scaffold particles comprise a material selected from the group consisting of boron, carbon, chromium, cobalt, copper, iron, manganese, molybdenum, nickel, phosphorus, silicon, titanium, tin, tungsten, vanadium and zinc, and mixtures, alloys or composites thereof.
1.13 The metal paste of 1.01, wherein the metal scaffold particles comprise a material selected from the group consisting of copper, nickel, aluminum and titanium.
1.14 The metal paste of 1.01, wherein:
   a. the metal scaffold particles are in the morphology of a core-shell particle with a core comprising a metal chosen from iron, copper or titanium and a shell comprising cobalt or nickel, wherein the shell material is approximately <100 nm in thickness; or
   b. the metal scaffold particles are in the morphology of a core-shell particle with a core comprising iron and a shell comprising cobalt or nickel, wherein the shell material is approximately <25 nm in thickness.
1.15 The metal paste of 1.01, wherein the metal scaffold particles are in the morphology of a core-shell particle with a shell comprising chromium, cobalt or nickel.

1.16 The metal paste of 1.01, wherein the metal infiltrant particles have D50 between 50 nm and 1 μm, such as between 50 nm and 300 nm or between 50 nm and 100 nm.

1.17 The metal paste of 1.01, wherein the metal infiltrant particles comprise members selected from the group containing aluminum, boron, carbon, chromium, cobalt, copper, iron, magnesium, manganese, molybdenum, nickel, phosphorus silicon, tin, titanium, tungsten, vanadium and zinc.

1.18 The metal paste of 1.02, wherein the inorganic reactive component has a D50 particle size between 10 and 200 nm, such as between 100 and 200 nm, 25 and 100 nm or 10 and 50 nm.

1.19 The metal paste of 1.02, wherein the inorganic reactive component particles have a surface ligand limiting reactivity, selected from the group containing: poly(vinylpyrrolidinone), poly(acrylamide), poly(acrylic acid), poly(ethyelene oxide), poly(vinyl alcohol), poly(ethylene terephthalate), ethyl cellulose, methyl cellulose, hydroxyethyl cellulose, nitrocellulose, gaur gum and xantham gum.

1.20 The metal paste of 1.02, wherein the inorganic reactive component comprises aluminum, boron, carbon, iron, oxygen, potassium or sodium.

1.21 The metal paste of 1.20, wherein the inorganic reactive component comprises both a reducing and oxidizing species.

1.22 The metal paste of 1.02, wherein the inorganic reactive component is a plurality of particles comprising boron, iron, and oxygen, the plurality of particles being coated with a ligand species, such that an oxidative, gas generating, or ablative reaction is triggered with approximately 0.1-10 W/mm$^3$, such as 0.1-1 W/mm$^3$ or 1-10 W/mm$^3$ of laser power.

1.23 The metal paste of 1.03, wherein the metal paste comprises from between 0.5 and 5 wt % of the inorganic reinforcing component, the inorganic reinforcing component being selected from single wall carbon nanotubes, multiwall carbon nanotubes, carbon nanofibers, boron nitride, boron carbide, alumina, aluminum nitride, silica, silicon carbide, and tungsten carbide.

1.24 The metal paste of 1.03, wherein the metal paste comprises between 0.5 and 5 wt % of the inoganic reinforcing component, the inorganic reinforcing component comprising carbon nanotubes with diameters between 10-50 nm and lengths from 500 nm-20 μm.

2.01 A metal paste utilized in the layerwise growth of metal structures, comprising:
  a. a vehicle comprising a binder and a solvent, the vehicle being at a concentration of 3-10 wt % of the metal paste;
  b. metal scaffold particles comprising greater than 99.5 wt % iron and less than 0.5 wt % carbon, the metal scaffold particles having a D50 particle size of between 1 μm and 8 μm and being at a concentration of between 50-70 wt % of the metal paste;
  c. metal infiltrant particles comprising nickel and having a D50 particle size of less than ⅕ of the D50 particle size of the metal scaffold particles, such that the metal infiltrant particles primarily position in the interstitial spaces formed between the metal scaffold particles, the metal infiltrant particles being at a concentration of 10-30 wt % of the metal paste.

2.02 The metal paste of 2.01, further comprising an inorganic reactive component comprised of boron, copper, and iron, and having a D50 particle size of less than 200 nm.

2.03 The metal paste of 2.01, further comprising an inorganic reinforcing component comprised of a carbon nanomaterial, and having a diameter that is less than 100 nm.

2.04 The metal paste of 2.01, wherein the metal scaffold particles consist of greater than 99.5 wt % iron and less than 0.5 wt % carbon, and the metal infiltrant particles consist essentially of nickel.

3.01 An additive manufacturing method for depositing a metal past to produce a metal part, the method comprising:
  (a) depositing a metal paste to form a wet film on a metal or ceramic substrate, wherein the metal paste comprises: (i) metal scaffold particles with D50 particle size between 1 μm and 5 μm, the metal scaffold particles having a concentration of between 50-70 wt % of the metal paste: (ii) metal infiltrant particles with D50 particle size of less than ⅕ of the D50 particle size of the metal scaffold particles, such that the metal infiltrant particles primarily position in the interstitial spaces formed between the metal scaffold particles, the metal infiltrant particles being in a concentration of 10-30 wt % of the metal paste;
  (b) drying the wet film until a solvent is essentially removed from the wet layer by energy input, and some residual components of the wet film optionally decompose, thereby forming a dried film;
  (c) performing a laser scribing in which material is selectively removed from the dried film by light excitation with laser power between 1-10 W to define a layer shape;
  (d) sintering the dried film, wherein energy is applied to the film such that the layer is heated to a temperature of between 500-800° C. and metal particles fuse together and with the underlying layer;
  (e) repeating (a) to (d) to produce the metal part.

3.02 The method of 3.01, wherein the dried film has a thickness, the thickness of the dried film undergoes between 20-40% linear contraction in a direction normal to the layer during the sintering step.

3.03 The method of 3.01, wherein depositing the metal paste comprises depositing a controlled thickness of paste between 5 μm and 250 μm at linear speeds of 10-200 mm/s with line widths of 50-500 μm, by varying deposition pressure, extrusion aperture diameter, and nozzle movement.

3.04 The method of 3.01, further comprising an assembly step and a post-annealing step wherein the metal piece is thermally processed at a temperature between 600-900 C. after performing (e).

3.05 The method of 3.04, wherein the resultant metal part has a porosity between 1%-15% of the total volume after the final post-annealing step.

3.06 The method of 3.04, wherein the metal part undergoes between 1-15% volumetric contraction during the final post-annealino step.

3.07 The method of 3.01, wherein the metal part comprises iron and has an ultimate tensile strength of between 500-1,000 MPa, a Brinell hardness between 100-200 BH, and an elastic modulus between 100-150 GPa after the final post-annealing step.

3.08 The method of 3.01, wherein the metal part has an average surface roughness between 0.2 μm and 2 μm after the final post-annealing step.

4.01 A metal paste composition comprising:
a first plurality of metal particles, wherein the first plurality of metal particles comprises a first particle size distribution;
a second plurality of metal particles, wherein the second plurality of metal particles comprise a second particle size distribution that is smaller than the first particle size distribution; and
a third plurality of metal particles, wherein the third plurality of metal particles comprise a third particle size distribution that is smaller than the second particle size distribution.

4.02 The composition of 4.01, wherein the first particle size distribution ranges from 10-40 μm, the second particle size distribution ranges from 1-10 μm, and the third particle size distribution ranges from 0.1-1.0 μm.

4.03 The composition of 4.01, wherein a population of the first plurality of metal particles is greater than a population of second plurality of metal particles, and the population of the first plurality of metal particles is greater than a population of the third plurality of metal particles.

4.04 The composition of 4.01, further comprising a binder a solvent, and a dispersant.

4.05 The composition of 4.01, wherein the first and second plurality of metal particles are spherical in shape.

5.01 A metal paste capable for use in additive manufacturing comprising the formulations shown in Tables 1A, 1B or 1C.

6.01 A method for forming a metal paste capable for use in additive manufacturing to form a metal part, the method comprising:
providing a first plurality of metal particles, wherein the first plurality of metal particles comprises a first particle size distribution, and wherein a composition of the first plurality of metal particles is close to or the same as a composition of the metal part;
providing a second plurality of metal particles, wherein the second plurality of metal particles comprises a second particle size distribution that is smaller than the first particle size distribution;
providing a third plurality of metal particles, wherein the third plurality of metal particles comprises a third particle size distribution that is smaller than the second particle size distribution, and wherein a composition of the third plurality of metal particles minimizes reactivity;
wherein a composition of the second plurality of metal particles is chosen to balance a composition of the metal part with respect to the composition of the first and second plurality of metal particles and a metallurgical composition of the metal part;
wherein an average of the compositions of the first, second, and third plurality of metal particles equals the metallurgical composition of the metal part; and
mixing the first, second, and third plurality of metal particles with a binder, a dispersant, and a solvent to form the metal paste.

6.02 The method of 6.01, wherein providing a first plurality of metal particles comprises selecting the first plurality of metal particles to have an elemental deficit.

6.03 The method of 6.01, wherein providing a first plurality of metal particles comprises selecting the first plurality of metal particles to have a composition that is the same as the metal part.

6.04 The method of 6.01, wherein providing a third plurality of metal particles comprises selecting the third plurality of metal particles to resist oxidation.

6.05 The method of 6.01, wherein providing a second and third plurality of metal particles comprises selecting the second and third plurality of metal particles to have a high sphericity.

7.01 A metal paste for use in the layerwise growth of metal structures, comprising:
a vehicle comprising at least one solvent and at least one polymeric binder;
metal scaffold particles comprising a structural metal, the metal scaffold particles having a D50 particle size; and
metal infiltrant particles with a D50 particle size such that the metal infiltrant particles primarily position in interstitial spaces between the metal scaffold particles.

7.02 The metal paste of 7.1, wherein the metal scaffold particles selected from the group consisting of aluminum, boron, carbon, chromium, cobalt, copper, iron, manganese, molybdenum, nickel, phosphorus, silicon, titanium, tin, tungsten, vanadium and zinc, and mixtures, alloys or composites thereof.

7.03 The metal paste of any of 7.1 to 7.02, wherein the metal scaffold particles comprise a material selected from the group consisting of iron alloys, nickel alloys, copper alloys and aluminum alloys.

7.04 The metal paste of any of 7.1 to 7.03, wherein the metal infiltrant particles comprise a material selected from the group containing aluminum, boron, carbon, chromium, cobalt, copper, iron, magnesium, manganese, molybdenum, nickel, phosphorus, silicon, tin, titanium, tungsten, vanadium and zinc, and mixtures, alloys or composites thereof.

7.05 The metal paste of any of 7.1 to 7.04, wherein the metal infiltrant particles comprise one or more ordered alloy phases formed between the following pairs of elements: Fe—V, Fe—Mn, Fe—Mo, Fe—Cr, Fe—Ni, Fe—Al, Fe—Cu, Fe—B, Fe—Si, Fe—W, Fe—P, Fe—Ti, Fe—Zr, Ni—Al, Ni—B, Ni—Cr, Ni—Co, Ni—Mn, Ni—Mo, Ni —Si, Ni—W, Ni—Zr, Cu—Be, Cu—Cr, Cu—Mn, Cu—P, Cu—B, Cu—Si, Cu—Te, Al—Sn, Al—Si, Al—P, Al—B, and Al—Ti.

7.06 The metal paste of any of 7.1 to 7.05, wherein the metal scaffold particles have a D50 ranging from 1 μm to 40 μm, such as a D50 ranging from 2 μm to 30 μm, or a D50 ranging from 1 μm to 20 μm.

7.07 The metal paste of any of 7.1 to 7.06, wherein the metal infiltrant particles have a D50 ranging from 0.5 μm to 10 μm, such as a D50 ranging from 0.1 μm to 1 μm or a D50 ranging from 0.2 μm to 0.8 μm.

7.08 The metal paste of any of 7.1 to 7.07, wherein the vehicle comprises a solvent selected from the group consisting of water, ethylene glycol, diethylene glycol, diethylene glycol monobutyl ether, triethylene glycol monobutyl ether, methanol, ethanol, propanol, butanol, pentanol, hexanol, heptanol, octanol, terpineol, texanol butyl ester, mineral spirits, propylene carbonate, pentane, hexane, cyclohexane, heptane, octane, nonane, decane, undecane, dodecane, tridecane, tetradecane, toluene, benzene, xylene, mesitylene, tetrahydrofuran, ethanolamine and N-methylpyrrolidone, dichloromethane, toluene, ketones, dimethylacetamide, acetone, methyl ethyl ketone, cyclohexanone, methyl acetate and n-butyl acetate.
7.09 The metal paste of any of 7.1 to 7.08, wherein the vehicle comprises a binder selected from the group consisting of poly(ethyelene oxide); ethyl cellulose; methyl cellulose; agar; hydroxyethyl cellulose; nitrocellulose; polymethylmethacrylate, polystyrene, polyester, methylacrylate, ethylacrylate, butylacrylate, acrylonitrile copolymer, maleic acid, and maleic acid ester; polyvinyl acetate; polyethylene; polypropylene; polyvinylbutyral; poly(carbonate), poly(acrylic acid): rosin; modified rosin; terpene resin; phenolic resin; paraffin wax, ethylene vinyl alcohol, polycaprolactam, and combinations thereof.
7.10 The metal paste of any of 7.1 to 7.09, wherein the vehicle comprises a binder with a decomposition temperature of approximately 200-350° C., with a residual carbon content of approximately between 0.1 wt %-0.5 wt % of the total metal paste.
7.11 The metal paste of any of 7.1 to 7.10, wherein the vehicle comprises a binder with a decomposition temperature of 200-250° C., with a residual carbon content <0.5 wt % of the total metal paste, or the vehicle comprises a binder with a decomposition temperature of 250-300° C., with a residual carbon content <0.5 wt % of the total metal paste.
7.12 The metal paste of any of 7.1 to 7.11, wherein the metal paste has a viscosity between approximately 10,000-1,000,000 cps, such as 50,000-500,000 cps or 100,000-300,000 cps.
7.13 The metal paste of any of 7.1 to 7.12, wherein the solids loadings is between approximately 50-95 wt %, such as 75-95 wt % or 90-95 wt %, of the total metal paste.
7.14 The metal paste of any of 7.1 to 7.13, wherein the metal scaffold particles comprise a surface ligand selected from the group consisting of oleic acid, octanoic acid, octylamine, triethylamine, ethylenediamine, adipic acid, sebacic acid, poly(acrylic acid), poly(ethyelene oxide), ethyl cellulose, methyl cellulose, hydroxyethyl cellulose and nitrocellulose.
7.15 The metal paste of any of 7.1 to 7.14, wherein the metal scaffold particles are in the morphology of a core-shell particle.
7.16 The metal paste of any of 7.1 to 7.15, further comprising an inorganic reactive component.
7.17 The metal paste of 7.16, wherein the reactive inorganic component particles comprise a surface ligand for limiting reactivity, the surface ligand selected from the group consisting of poly(vinylpyrrolidinone), poly(acrylamide), poly(acrylic acid), poly(ethyelene oxide), poly(vinyl alcohol), poly(ethylene terephthalate), ethyl cellulose, methyl cellulose, hydroxyethyl cellulose, nitrocellulose, gaur gum and xantham gum.
7.18 The metal paste of any of 7.16 to 7.17, wherein the reactive inorganic component comprises at least one compound selected from aluminum, boron, carbon, iron, oxygen, potassium and sodium.
7.19 The metal paste of any of 7.1 to 7.18, further comprising an inorganic reinforcing component.
7.20 The metal paste of 7.19, wherein the metal paste comprises from between 0.5 and 5 wt % of the inorganic reinforcing component, the second inorganic reinforcing component being selected from single wall carbon nanotubes, multiwall carbon nanotubes, carbon nanofibers, boron nitride, boron carbide, alumina, aluminum nitride, silica, silicon carbide, and tungsten carbide.
7.21 The metal paste of any of 7.1 to 7.20, wherein the metal scaffold particles comprise a large population of particles comprising iron at a concentration of about 70% to 100% by weight with a first D50 and a small population of particles comprising iron at a concentration of about 70% to 100% by weight with a second D50 that is smaller than the first D50.
7.22 The metal paste of 7.21, wherein the large population of particles comprising iron has a lower concentration of iron than the small population of particles comprising iron.
7.23 The metal paste of any of 7.21 to 7.22, wherein both the large population of particles comprising iron and the small population of particles comprising iron further comprise carbon.
7.24 The metal paste of any of 7.1 to 7.23, wherein the metal scaffold particles further comprise a population of particles comprising nickel at a concentration of 95% by weight or more and having a first D50 nickel particle size.
7.25 The metal paste any of 7.1 to 7.24, wherein the metal infiltrant particles comprise a second population of particles comprising nickel at a concentration of 95% by weight or more, the second population of particles comprising nickel having a second D50 nickel particle size that is less than the first D50 nickel particle size.
7.26 The metal paste any of 7.1 to 7.25, wherein the metal infiltrant particles comprise a population of particles comprising copper, the population of particles comprising 90% by weight copper or more.
7.27 The metal paste of any of 7.1 to 7.26, wherein the metal infiltrant particles further comprise oxygen.
7.28 The metal paste of any of 7.1 to 7.26, wherein the metal infiltrant particles have a D50 particle size of about ¼ or less of the D50 particle size of the metal scaffold particles, such as a D50 particle size of about ⅕ or less of the D50 particle size of the metal scaffold particles.
8.01 An additive manufacturing method for depositing a metal paste, the method comprising:
(a) depositing a metal paste to form a wet film on a metal or ceramic substrate, wherein the metal paste comprises: (i) metal scaffold particles comprising iron, the metal scaffold particles having a D50 particle size; (ii) metal infiltrant particles with D50 particle size of less than ⅕ of the D50 particle size of the metal scaffold particles, such that the metal infiltrant particles primarily position in the interstitial spaces formed between the metal scaffold particles, the metal infiltrant particles being in a concentration of 10-30 wt % of the metal paste;
(b) drying the wet film until a solvent is essentially removed from the wet layer by energy input, and some residual components of the wet film optionally decompose, thereby forming a dried film and
(c) optionally performing a laser scribing in which material is selectively removed from the dried film by light excitation with laser power between 1-10 W to define a layer shape.
8.02 The method of 8.01, further comprising repeating (a) to (c) plurality of times to form a part having a desired shape, and further carrying out a post-anneal of the part.

It is to be understood that both the foregoing general description and the following detailed description are exemplary and explanatory only and are not restrictive of the present teachings as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

FIG. 3A shows a surface of the resultant film made by reactive sintering of metal paste. FIG. 3B shows a fracture surface of a metal part produced by the reactive sintering of metal paste.

Figure 1A:
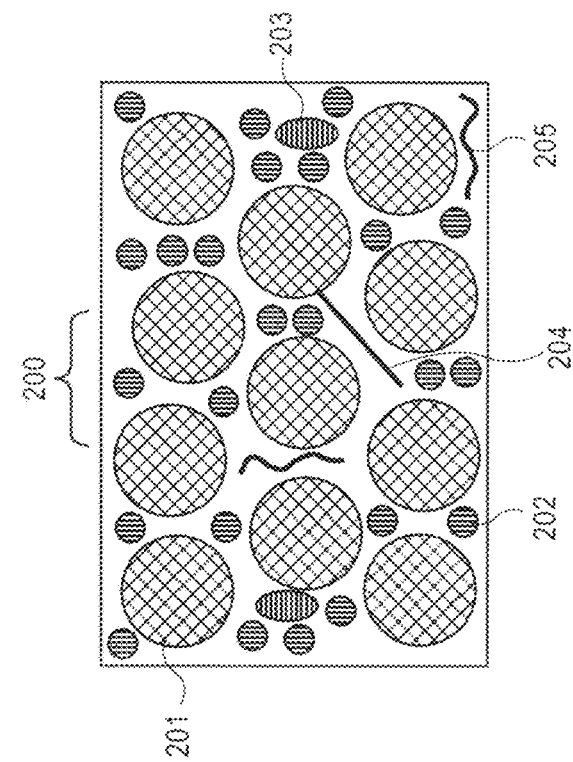
FIG. 1A illustrates a distribution of particles in a representative metal paste in which the particles are optimally dispersed in a liquid state, according to an embodiment of the present disclosure.

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawing. In the drawings like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

The present disclosure is directed to an improved version of additive manufacturing that uses sintering of metal pastes combined with simultaneous metal infiltration. The method makes use of a metal source that can be used in a layerwise deposition technique that avoids long processing times, high temperatures (>1000 C) and inhomogeneity in mechanical properties. The materials and processes of the present disclosure can provide for use of a lower power energy source and yet still produce high strength metals parts. This improvement can be realized with a metal source that can produce strong metal parts by sintering instead of melting. The source can take the form of a powder with smaller diameters than conventional "coarse" powders.

Thus, the present disclosure is related to materials that can be used to form functional metal pieces by producing an easily sintered layer of dried metal paste. The metal paste constituents are described by their role in the formation of a metal matrix during a layerwise sintering process. The selection of a scaffold and infiltrant material pair's composition and particle size distributions, along with a range of additives and formulation properties, enables the use of the disclosed paste by a disclosed hybrid additive manufacturing method. For this material to realize mechanical and processing benefits, the infiltrant particles are chosen such that they pack in the interstitial voids of a matrix of the scaffold particles and also infiltrate the porous scaffold particle body on heating.

The presented embodiments disclosed herein relate to a metal paste which is comprised of elements which enable its use in an additive manufacturing technique. Briefly, the metal paste is deposited onto a substrate in a desired shape, dried, optionally shaped by a laser scribing, and sintering with energy input. The process is repeated until the final desired shape is formed from individual layers. The skilled artisan will readily appreciate, however, that the materials and methods disclosed herein will have application in a number of other contexts where it is advantageous to fabricate metal through a sintering process in arbitrary shapes at low energies and ambient pressure.

These and other objects and advantages of the present disclosure will become more fully apparent from the following description taken in conjunction with the accompanying drawings.

All publications referred to herein are incorporated by reference in their entirety for all purposes as if fully set forth herein.

"Metal pastes" describes the material resulting from distributing metal particles in a liquid; other terms including "dispersion, " and "suspension" can be used interchangeably. Metal pastes are characterized most typically by their content, total solids loading, and viscosity. "Solids loading" describes the combined mass of all species that are not liquid in a paste over the total mass. "Viscosity" describes the measure of a materials resistance to flow and is typically measured at a shear rate of 4 sec^-1 on a Brookfield DV2-HB-5 viscometer at 25° C. and ambient pressure. A "paste" is typically delineated from an ink by having a high viscosity, usually a threshold is defined at 10,000 cps, such that a dispersion or suspension with a higher viscosity will retain its shape over a time of approximately 0.1-10 seconds. A dispersion or suspension with a viscosity below the 10,000 cps threshold is typically referred to as an ink and is processed using different techniques and commonly involves different material selection.

The metal pastes described below are intended to be processed into a final metal part. The terms "metal part, " "metal pieces, " "resulting part," and "resulting piece" are used interchangeably to describe the product of the sintering layers of paste into a desired shape. Reference is made to this process, wherein the plurality of metal particles are sintered. "Sintering" describes a process involving the fusion of individual particles through atomic movement at temperatures between 0.6× and 0.9× the melting point of a given metal (e.g. iron, with a melting point of 1538° C. is typically sintered at temperatures between 922° C. and 1384° C.). In all metal pastes, the metal particles are assumed to be evenly distributed, or in a fully dispersed state. Pastes and layers are described as being in their "wet" state while there is solvent present and as "dry" once the solvent has been largely removed.

All of the solid materials described herein are powders, also termed "particles, microparticles, nanoparticles" as appropriate from particle size distribution. The terms "D50" and "D90" describe a property of a particle population; specifically the particle diameter, which is greater than that of 50% of the volume of particles and the diameter greater than that of 90% of the volume of particles, respectively. D50, D90, and other characteristics related to particle size distributions are measured using static light scattering particle size analyzer, such as a Beckman Coulter LS230. The term "diameter" is understood to mean "D50" when referring to a population of particles. The D50 can also be measured using techniques such as scanning electron microscopy (SEM) or dynamic light scattering, "Powder" and "particles" are also used interchangeably to describe discrete metal pieces, typically with sizes of from approximately 1 nm-100 µm.

Metal Scaffold Material

The material for the metal scaffold particles is chosen to provide a structural backbone to the final metal part, and as such is typically selected from a group of "structural metals." This term describes metals that are used to build objects in engineering or consumer applications such that their design and selection rely on their mechanical properties, including hardness, strength, and toughness.

The particles used in many embodiments are designed, classified, or chosen to have a D50 between 1 and 5 µm and a D90 between 2 and 10 µm, or with a D50 between 1-3 µm and a D90 between 2-6 µm, or with a D50 between 1-8 µm and a D90 between 2-16 µm, or in any range subsumed therein. The particle size is chosen so that a wet film of the metal paste will have a homogeneous distribution of particles through its wet film thickness, typically 20-200 µm. Additionally, the article shape may be approximately spherical in some embodiments, due to the higher powder packing density this enables. FIG. 1A shows item 100, comprising wet metal paste with well dispersed metal scaffold particles 101 surrounded by solvent 106 and binder 105. On drying, the item 100 is converted into item 200 of FIG. 1B, The metal scaffold particles 201 of item 200 pack into an optimal configuration due to their spherical shape and the lubricating action of binder 105 during the drying process.

In some embodiments, the oxidation sensitivity of the metal scaffold material is a limiting factor during sintering, and an anti-oxidative coating is applied to the particles' surfaces. It is known in the art that many metals can be coated by chemical precipitation onto a particle surfaces so as to form a shell. As such, the metal scaffold particles may have a shell with thickness between 10-25 nm, or 50-100nm, of a metal comprising, for example, chromium cobalt or nickel.

Metal Infiltrant Material

The metal infiltrant material is selected so that it can most effectively perform the following roles: (1) Fit in interstitial pores of the scaffold particles; diffuse or flow among the scaffold particle matrix at a temperature approximately in the range from 700-1100° C., or in any range subsumed therein, or from 1100-1400° C. or in any range subsumed, or from 1400-1700° C. or in any range subsumed therein; (2) Provide some mechanical strength during the drying process; and (3) Assist in fusion of the scaffold particles during the sintering process. To better fit into the interstitial pores of the larger scaffold particles, in some embodiments the D50 (and D90) of the metal infiltrant particles, may be between 50 nm-1 µm (D90 2 µm), or 50-300 nm (D90 600 nm), or 50-100 nm (D90 200 nm), or in any range subsumed by the listed ranges. Thus, for example, the D90 may range from 200 nm to 2 µm. In one embodiment, the D50 of the metal infiltrant particle is less than ⅕ of the D50 of the metal scaffold particles.

Figure 1B:
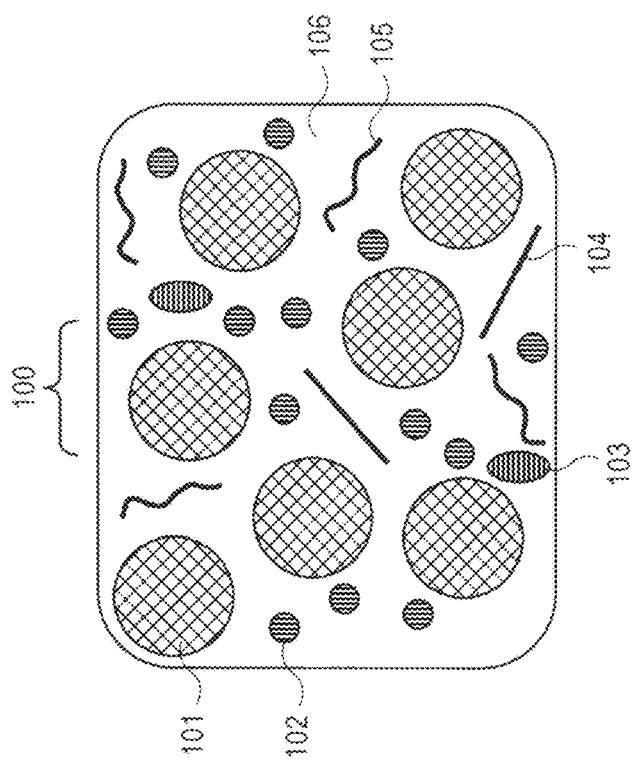
FIG. 1B illustrates the metal paste of FIG. 1A after the metal paste has been dried into a thick film with a preferred packing arrangement, according to an embodiment of the present disclosure.

The position of the infiltrant particles in the wet and dried metal pastes is shown in FIGS. 1A and 1B, respectively. In wet metal paste 100, the infiltrant articles 102 are dispersed amongst the larger scaffold particle 101 in solvent 106. The infiltrant particles 202 are optimally sized to fit into the pores formed by scaffold material 201 once the metal paste is substantially free of solvent, as represented in item 200. Residual binder molecules 203 are also present in the dried film, providing some mechanical strength to the shape prior to the sintering step.

Material Selection for Metal Scaffold and Infiltrant Metals

The most desired metals for additive manufacturing are structural metals, and they are most typically mixtures of many elements in the form of an alloy, such as steel. As such, they comprise a majority of one element and a plurality of minority elements, selected to impart specific properties to the resulting alloy. Iron and iron-containing alloys that are suitable as materials for the metal scaffold and metal infiltrant materials can be produced industrially by any number of techniques, such as but not limited to the following techniques: liquid phase chemical precipitation, gas phase precipitation, flame spray pyrolysis, inert gas atomization, water atomization, plasma atomization, and mechanical attrition.

In some embodiments, the metal scaffold particles comprise boron, carbon, chromium, cobalt, copper, iron, manganese molybdenum, nickel, phosphorus, silicon, tin, titanium, tungsten, vanadium, or zinc, and mixtures, alloys, and composites thereof. In other embodiments, the scaffold is comprised of non-iron materials, selected from the group consisting of copper, titanium, nickel, and aluminum, with no substantial iron content. These non-iron scaffold materials can be produced as essentially spherical particles with D50, fabrication, and processing similar to iron-containing particles.

In some embodiments, the metal infiltrant material may comprise aluminum, boron, carbon, chromium, cobalt, copper, iron, magnesium, manganese molybdenum, nickel, phosphorus, silicon, tin, titanium, tungsten, vanadium or zinc. In other embodiments, the melting point of the infiltrant material may be a temperature approximately in the range from 700-1100° C., or in any range subsumed therein, or from 1100-1400° C. or in any range subsumed, or from 1400-1700° C. or in any range subsumed therein.

In further embodiments, the scaffold and infiltrant materials can be paired, for example, as follows: scaffold alloy comprising iron with infiltrant alloy comprising copper; scaffold alloy comprising iron with infiltrant alloy comprising nickel; scaffold alloy comprising iron with infiltrant alloy comprising iron; scaffold alloy comprising copper with infiltrant alloy comprising copper; scaffold alloy comprising nickel with infiltrant alloy comprising copper; scaffold alloy comprising copper with infiltrant alloy comprising nickel; scaffold alloy comprising titanium with infiltrant alloy comprising aluminum; scaffold alloy comprising titanium with infiltrant alloy comprising nickel. It is understood that the listed alloys are described by their majority element for brevity and may contain minor alloying elements to provide enhanced mechanical and chemical properties.

Reactive Infiltration

In conventional infiltration, a scaffold material is modified by the addition of another material which fills in pore spaces at elevated temperature, leading to a higher apparent density. Apparent density is defined as the ratio of the mass of a metal piece and its apparent volume as measured by measurement of exterior dimensions or as measured by volumetric displacement of a fluid. The infiltration by means of high temperatures (>1000° C.) and long times (>24 hours) enables higher apparent densities and correlated mechanical properties. Common scaffold/infiltrant pairs are taught in the art such that the infiltrant metal has a lower melting point than the scaffold metal (e.g. Iron alloys as scaffold and copper alloys as infiltrant).

The present disclosure provides a manner of avoiding this material selection constraint. Reactive infiltration can be described as any of the following situations occurring at temperatures below the melting point of the infiltrant material: the scaffold and infiltrant material diffuse into one another; the infiltrant diffuses into the scaffold; the scaffold diffuses into the infiltrant; and the scaffold and infiltrant form an alloy, mixture, or compound; the scaffold and infiltrant react in the presence of an additive (i.e. boron) to form an alloy, mixture, or compound. In some embodiments of the current disclosure, the metal paste is formulated such that reactive infiltration encourages the consolidation of the structure at low temperatures in the absence of melting, thereby enhancing the strength, hardness, wear resistance, corrosion resistance, and toughness of the resulting metal part. In some embodiments, the metal scaffold has a melting point approximately 200-400° C. greater than that of the metal infiltrant, in other embodiments, the metal scaffold has a melting point approximately 200-400° C. less than that of the metal infiltrant. In still other embodiments, the metal scaffold has a melting point approximately 0-100° C. greater or less than that of the metal infiltrant.

Figure 2B:
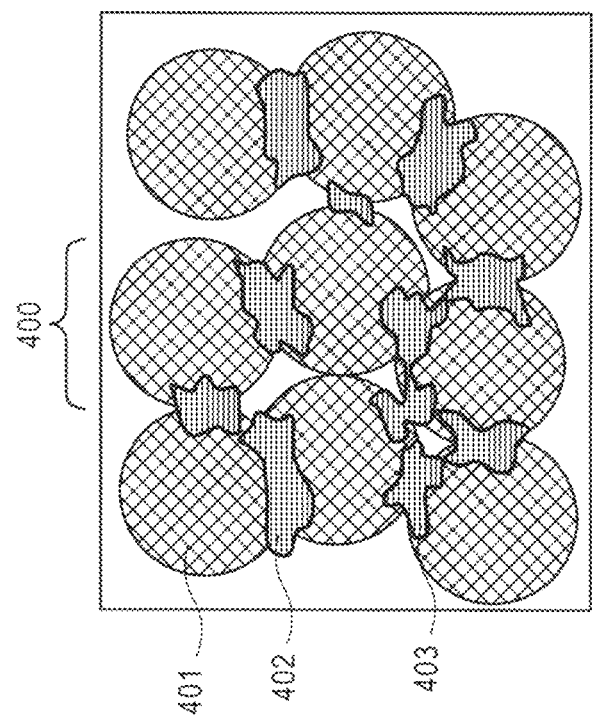
FIG. 2B illustrates a metal microstructure produced by sintering a representative metal paste wherein a scaffold material and infiltrant material have similar melting points and reactive infiltration occurs, according to an embodiment of the present disclosure.
Figure 2A:
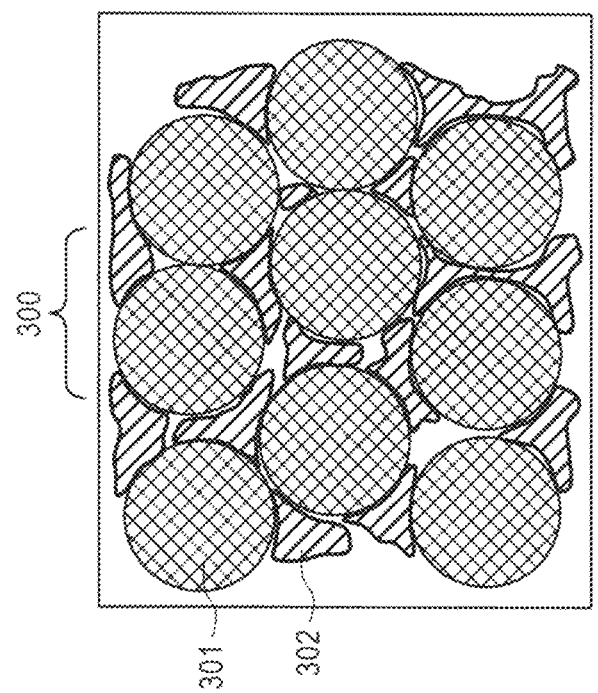
FIG. 2A illustrates a metal microstructure produced by sintering a representative metal paste wherein the scaffold material has a higher melting point than the infiltrant and reactive infiltration does not occur, according to an embodiment of the present disclosure.

Enhanced solid state diffusion is a sintering phenomenon in which atoms of a first material are transported by or within a second material, commonly at a rate which is significantly greater than self-diffusion of the first material. Enhanced solid state diffusion or melting are advantageous in embodiments of the present disclosure in which the melting point of the infiltrant material is lower than that of the scaffold material, such as shown in sintered item 300 illustrated in FIG. 2A. Metal scaffold particles 301 are coated by highly mobile metal infiltrant 302. The coalescence of scaffold particles 301 is enhanced by diffusion of scaffold material in the mobile infiltrant, in an assisted solid state diffusion event. In embodiments in which the melting point of the infiltrant and scaffold materials are similar or the melting point of the infiltrant is somewhat higher than the scaffold, as shown in sintered item 400 (FIG. 2B), metal scaffold particles 401 can lose their original shape upon reaction with reactive metal infiltrant 403, distorting due to extensive interdiffusion of the two metal species. The product layer 402 of the reaction between the scaffold and infiltrant materials can act to strengthen metal item 400 through bridging of previously discrete particles. In this way, materials which could previously not be used as scaffold/infiltrant pairs are now useful due to the placement of the infiltrant particles into the scaffold interstitial voids.

Figure 3A:
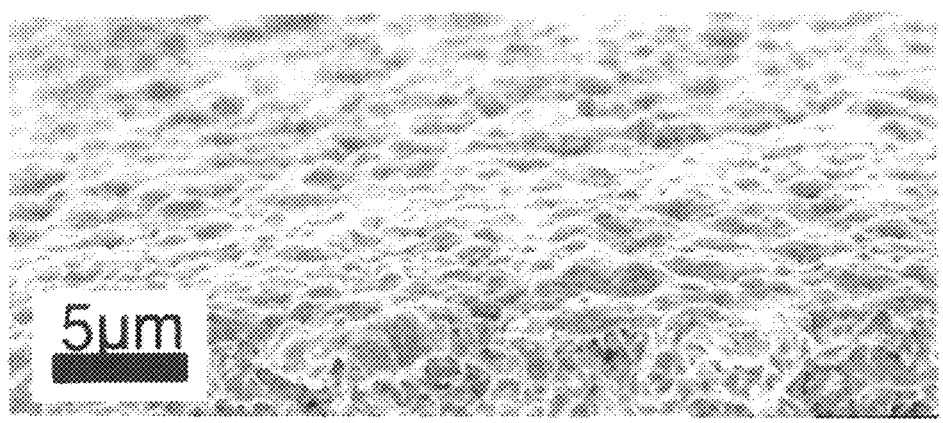
FIGS. 3A and 3B are SEM micrograph of an exemplary cross-sectioned metal part produced by a sintering technique (with a total sintering time of 30 minutes) with a representative metal paste comprising boron, carbon, cobalt, iron and nickel.
Figure 3B:
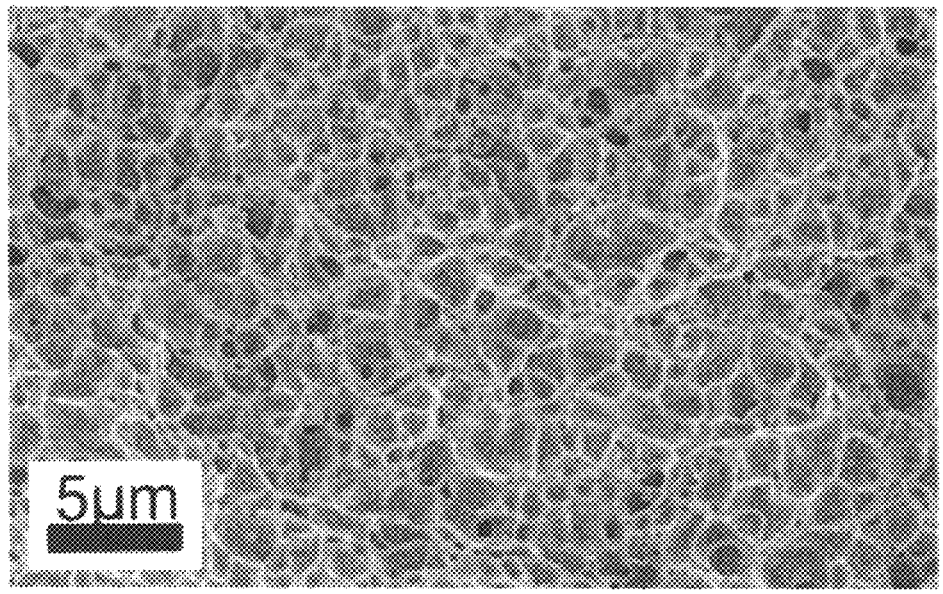

SEM micrographs of a representative metal paste with scaffold and infiltrant materials of similar melting points between approximate 1100-1400° C. are shown in FIGS. 3A and 3B. The top micrograph (FIG. 3A) shows the surface features, wherein the particle distortion wrought by reactive infiltration can be seen. Likewise, the bottom micrograph (FIG. 3B) shows a fracture surface 1 mm deep into the structure, produced my tensile force, in which extensive interdiffusion during low temperature sintering has produced a fine grain structure despite the brief sintering time of approximately 60 minutes.

Inorganic Reactive Material

To enable the metal paste to be used with a hybrid additive manufacturing technique, wherein material can be sequentially deposited and selectively removed, an inorganic reactive material (also referred to herein as a reactive inorganic component) is optionally included in the metal paste formulation. Typical structural metals do not vaporize until exposed to laser radiation of high energies because the absorption of laser light and reactivity of the metal particles are both low. The dramatically enhanced reactivity and laser absorption of nanomaterials leads to low energy ablation when the metal paste is exposed to a laser. The input energy from light can itself remove material through an ablative type reaction, or the generation of products (primarily gas) from the rapid reaction of the metal with air may, act as the means of material removal in some embodiments. The reactive nanomaterial responds to laser irradiation between 0.1-1 mW/mm$^3$ of laser irradiation, or between 1-10 mW/mm$^3$ laser irradiation, or any range subsumed therein. The time over which this power can be deposited can be approximately between 1 ms and 1 s on the excited volume, or any range subsumed therein, depending on the scan speed of the exciting laser. This reactivity is coupled to the high surface area of the reactive material particles. In some embodiments, the inorganic reactive material comprises particles with a D50 between 100 and 200 nm, or a D50 between 25 and 100 nm, or a D50 between 10 and 50 nm.

The reactive material comprises aluminum, boron, carbon, copper, iron, oxygen, potassium, or sodium, and in some embodiments is coated with a stabilizing surface ligand. The stabilizing surface ligand can be selected from the group containing poly(vinylpyrrolidinone), poly(acrylamide), poly(acrylic acid), poly(ethyelene oxide) poly(vinyl alcohol), poly(ethylene terephthalate), ethyl cellulose, methyl cellulose, hydroxyethyl cellulose, nitrocellulose, guar gum, and xantham gum. In some embodiments, the reactive inorganic compound is chosen such that the material undergoes a highly exothermic reaction with its stabilizing ligand or air solely when excited to the minimum energy level by laser irradiation. In another embodiment, the reactive material comprises both a reducing and oxidizing species, such as aluminum particles with an iron oxide shell or a mixture of iron oxide and aluminum particles, such that the exothermic reaction will occur with laser irradiation even in the absence of air. In FIGS. 1A and 1B, inorganic reactive material particles 103 and 203 are shown in both wet and dry films, respectively.

Inorganic Reinforcing Material

Secondary materials with nigh hardness are often mixed into metals to enhance mechanical properties, forming an object known in the art as a metal matrix composite. As such, the metal paste disclosed herein optionally comprises between 0.5-5 wt % of an inorganic reinforcing material. The inorganic reinforcing material is selected from the group containing: single wall carbon nanotubes, multiwall carbon nanotubes, carbon nanofibers, boron nitride, boron carbide, alumina, aluminum nitride, silica, silicon carbide, rand tungsten carbide. In some embodiments, wherein the particles are equiaxed, such as spheres, the reinforcing particles (also referred to herein as reinforcing material or reinforcing component, such as inorganic reinforcing components) have a D50 between 25-100 nm, such that they similarly can fit in interstitial pores of the metal scaffold. In other embodiments, the reinforcing material comprises carbon nanotubes with diameters between10-50 nm and lengths of from 500 nm-20 μm. In FIGS. 1A and 1B, inorganic reactive material particles 104 and 204 are shown in both wet and dry films, respectively.

Vehicle (Solvent and Binder)

All pastes described herein comprise a vehicle, which is a solution or dispersion of polymeric binder in a solvent. The solvent is selected for its ability to disperse the binder and the plurality of metal powders, and the majority of the solvent can be removed from the metal paste at a temperature from 150-300° C. Commonly, solvents are used as mixtures, with a high boiling point and low boiling point solvent mixed together to both enable greater solvation power of other species and also to impart two stage vaporization, such that the metal paste stiffens upon vaporization of the low boiling solvent. Solvents can be selected from the group consisting of the following: water, ethylene glycol, diethylene glycol, diethylene glycol monobutyl ether, triethylene glycol monobutyl ether, methanol, ethanol, propanol, butanol, pentanol, hexanol, heptanol, octanol, terpineol, texanol butyl ester, mineral spirits, propylene carbonate, pentane, hexane, cyclohexane, heptane, octane, nonane, decane, undecane, dodecane, tridecane, tetradecane, toluene, benzene xylene, mesitylene, tetrahydrofuran, ethanolamine and N-methylpyrrolidone, dichloromethane, toluene, ketones, dimethylacetamide acetone, methyl ethyl ketone, cyclohexanone, and n-butyl acetate.

Additionally, the vehicle comprises a polymeric binder to aid in paste-making and deposition. The binder can be one or a mixture of several members selected from the, following: poly(ethyelene oxide); ethyl cellulose; methyl cellulose; hydroxyethyl cellulose; nitrocellulose; polymethylmethacrylate, polystyrene, polyester, methylacrylate, ethylacrylate, butylacrylate, acrylonitrile copolymer, maleic acid, and maleic acid ester; polyvinyl acetate; polyethylene; polypropylene; polyvinylbutyral; poly(carbonate), poly(acrylic acid); rosin; modified rosin: terpene resin; phenolic resin; paraffin wax, ethylene vinyl alcohol, polycaprolactam and combinations thereof.

The binder is selected to have a decomposition temperature between 200° C.-350 ° C. or between 200° C.-250° C., or between 250° C.-300° C. For materials with these temperatures, the carbon content which remains after full combustion (e.g., which may occur at temperatures between 400-600° C. between the material and an oxidant, such as air) can be between 0.1 wt % and 0.5 wt % of the metal paste weight, or between 0.01 and 0.25 wt %. Particularly low residue of the binder remaining during sintering is advantageous due to sintering inhibition caused by excess carbon during the brief sintering event, resulting in lower mechanical strength of the final metal piece.

Surfactants and Dispersants

Prior to mixing the metal scaffold particles, the metal infiltrant particles, the inorganic reactive particles, and the inorganic reinforcing particles into a paste, these particles can optionally be treated with a surface ligand molecule to better enable their long-term stability in a dispersed state. Molecules used in this treatment are typically bifunctional, with one functionality interacting strongly with the particle surface and the other interacting with the solvent or binder molecules. In the case of the metal scaffold particles and metal infiltrant particles, typical surface molecules are selected from the following group: oleic acid, octanoic acid, octylamine, triethylamine, ethylenediamine, adipic acid, sebacic acid, poly(acrylic acid), poly(ethyelene oxide), ethyl cellulose, methyl cellulose, hydroxyethyl cellulose, nitrocellulose.

To further increase the long-term stability of pastes, and to provide other benefits during storage, deposition, and drying, other additives are typically included in small quantities in metal pastes. Dispersants are the most common additive, though it is known in the art that humectants, leveling agents, anti-settling agents, and surface tension reducing agents can be added. These and other additives can be purchased commercially and added in appropriate quantities as known by one skilled in the art.

Rheology of Formulations

The rheology of the metal paste is important to control due to its impact on deposition into a desired layer shape on a substrate. To achieve wet metal paste layer thicknesses of between 20-200 μm, pastes with varying solids loading can be formulated. A paste can be formulated with a viscosity that is low to form thin layers and high to form thick layers. One of the primary means of controlling viscosity in the disclosed metal pastes is through solids loading. Therefore, embodiments of the disclosed metal pastes are formulated with solids loadings between 50% and 95%, or 75% and 95%, or 90% and 95%, or any range subsumed therein. Furthermore, some embodiments of the metal paste are formulated to have a viscosity between 10,000-1,000,000 cps, or between 50,000-500,000 cps, or between 100,000-300,000 cps, or any range subsumed therein.

Method of Use in Additive Manufacturing

Figure 4:
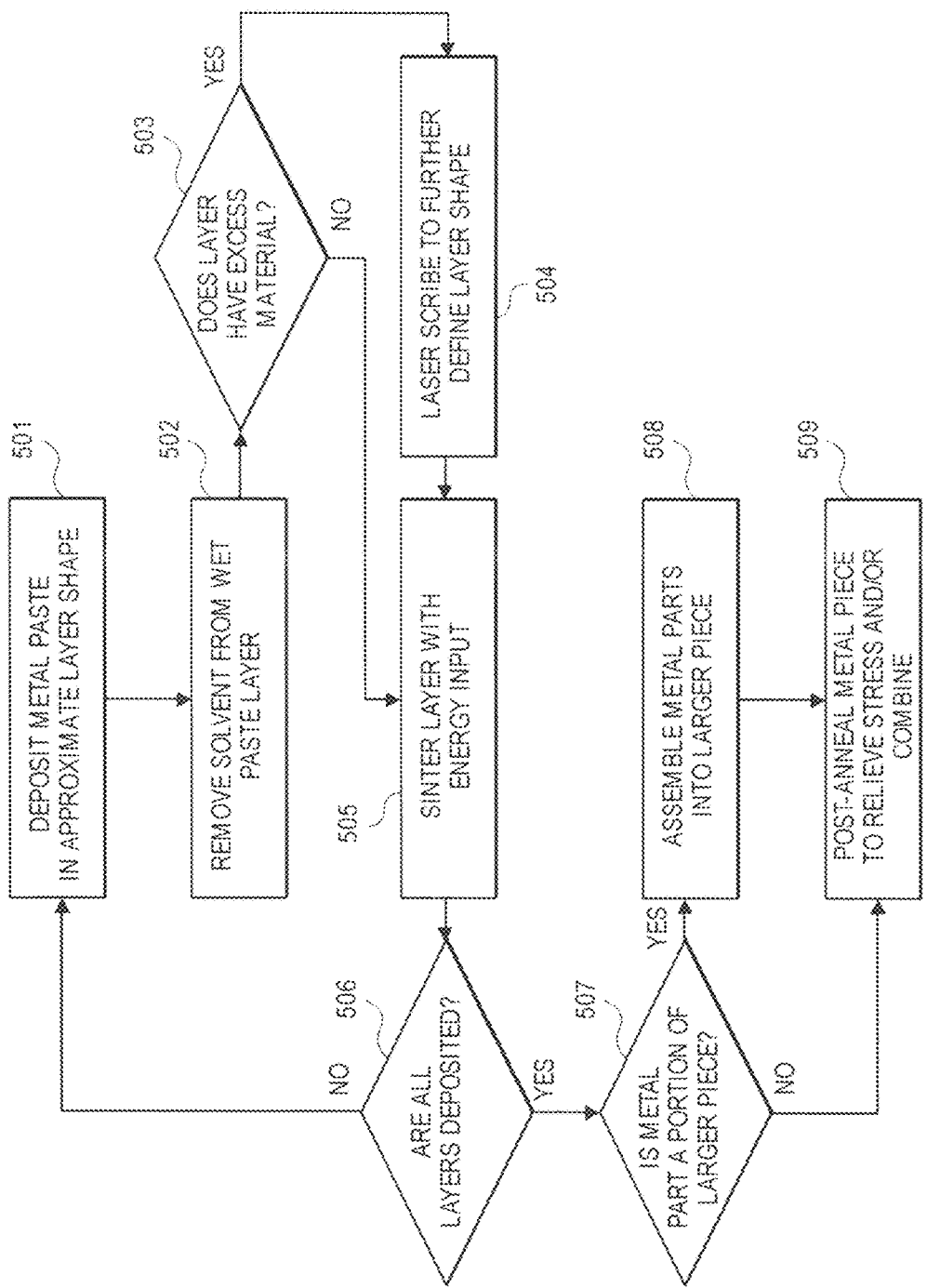
FIG. 4 is a process flow diagram illustrating an example method of using the disclosed metal pastes, according to an embodiment of the present disclosure.

One method of using the aforementioned pastes in additive manufacturing comprises the following steps: (1) Paste deposition (2) Solvent removal (3) Laser scribing (4) Sintering (5) Post-anneal. The process is repeated until the final desired shape is formed from individual layers. FIG. 4 shows a flow chart describing this process. At 501, a layer is deposited by, for example, spreading paste out of an extrusion nozzle. In some embodiments the paste is deposited in exactly the pattern of each layer to create the desired final metal piece. The solvent is removed from the wet paste layer at 502. In some embodiments, the solvent is removed by a heated build surface, or heated convective air flow, or by light based seating, or by inductive heating. As queried by the query at 503, in some embodiments, the paste is deposited precisely where it is needed, in which case it can be determined there is no excess material and the process goes to 505. Alternatively, in other embodiments, the paste is deposited in a semi-continuous or continuous layer on the build surface and the paste layer is then further shaped in step 504 by removing dried paste with light energy during the laser scribing step. Additionally, in these initial steps, further inert support pastes can be deposited, dried, and laser scribed, either to provide mechanical support or to further define the shape of the metal paste, for example carbon paste or boron paste. The paste deposition system can deposit metal paste layers with thicknesses between 5 μm and 250 μm at linear speeds of 10-200 mm/s with line widths of 50-500 μm. After paste deposition and drying, the optional laser scribing process uses a beam focused to a beam diameter of 25-100 μm to controllably remove a given thickness of dried metal paste by controlling the beam movement speed and power. Typical beam movement speeds are between 50-500 mm/s and laser powers are between 1-10 W in some embodiments. The laser scribing step can define a layer shape by removing dried metal paste, with a lateral resolution of 25 μm, enabling finer features than may be possible with paste deposition.

The sintering step 505 depends on the paste formulation, with the scaffold and infiltrant particles interacting in such a manner as to optimally grow grains and eject voids from the dried metal paste layer. During the processing of sinterable metal pastes comprising the described scaffold, infiltrant, reactive, and reinforcing particles, the particles are dried into a compact layer at each repetition. The dried metal paste layer can be sintered by incident energy each repetition, in one embodiment achieving a surface temperature between 500-800° C. by the action of an incandescent lamp or induction heating element. At these temperatures, the dried metal paste layer experiences linear contraction in the direction normal to the layer, contracting 20-40% in thickness due to ejection of voids out of the layer surface. If further layers are employed to complete the desired shape (506), the deposition, drying, scribing, and sintering steps can be repeated as many times as needed, if the piece is comprised of sufficient layers it can then be assembled into a larger shape with other such deposited metal pieces (507). The assembly process 508 comprises spreading further metal paste between the assembled pieces, such that the pieces are spaced between 1-10 µm, or 1-100 µm apart, with metal paste filling the space between. The assembled parts may then be post-annealed in step 509 such that residual stresses can be removed through slow heating and cooling. The final post-anneal is optionally performed to enhance mechanical properties and further reduce porosity to between 1-15 vol % by undergoing between 1-15 vol % contraction during heating. Typical post-annealing temperatures and time in some embodiments are 600-900° C. for 0.5-3 hours, in inert or ambient atmosphere.

When the described method is used with metal pastes, comprising primarily iron scaffold particles and infiltrant materials comprising copper and nickel, the resulting metal parts may have one or more, such as all, of the following physical properties: ultimate tensile strength between 500-1,000 MPa, a Brinell hardness between 100-200 BH, an elastic modulus between 100-150 GPa and average surface roughness between 0.2 µm and 2 µm. The method can be tailored to various metal pastes not described herein, though the most useful mechanical properties have been attained through the use of the described embodiments of sinterable metal pastes.

Embodiments with at least Three Populations of Metal Particles

Several embodiments will now be presented wherein metal pastes comprise at least three populations of metal particles, and optionally comprise binder, solvent, and dispersant. The advantages gained through formulations with multiple particle populations (multimodal) are higher strength of a resulting metal part and less shrinkage when used in a described metal additive manufacturing technique.

One component of this disclosure is the choice of the metal particles used in a metal paste so as to maximize the ratio of the measured density to the weighted true density once they've been printed and dried and/or debinded. The metal part is described as "green" at this stage and its density is termed "green density"). "True density" is defined as the density of a 100% solid (0% porosity) metal part with given metal constituents, such as would be created by casting or forging. One of ordinary skill in the art would understand that "Measured density", is the same a "apparent density", which is defined above. "Drying" is defined as the removal of solvent by temperatures near or above the boiling point of all solvents, and "debinding" is defined as the substantial removal of all binders by temperatures above the decomposition or boiling point of the majority of binders in a system.

Green density is a key determinant of the density of a metal part produced by using any, mixtures of metal particles in a metal paste in an additive manufacturing application. Specifically, it is important in additive manufacturing applications (such as the method described herein) that use sintering, or the fusion of discrete particles into a larger mass at temperatures below the highest melting point of the constituent materials to convert metal particles into structural metal parts at temperatures below the highest melting point of the constituent metals with a post-printing anneal. After a sintering operation is performed on a green body of particles, the measured density is defined as the "final density" or "final part density," and is given as a percentage of the true density of the metal part.

Higher green density of printed parts provides several benefits: the final density increases, and less energy, less time, and lower temperatures can be used to induce the transformation from "green" part to final metal part with a desired final part density. Final part density is correlated with properties such, as tensile strength, hardness, abrasion resistance, and impact resistance. Sufficient properties are typically seen once final part density is >95% of the true metal density.

To increase, (e.g., maximize) green density through selection of metal particles comprising a metal paste used in an additive manufacturing application, it is advantageous to use multiple populations with set ratios between their diameters (or D50), as measured by a particle size distribution.

Maximizing the geometric packing of all particle populations in one volume is equivalent to producing the highest green density, and one strategy to achieve this tight packing employs one population of particles to fill interstices formed by randomly close packing of a population of larger particles. Additionally, this effect can be repeated, such that even smaller particles can fill the interstices formed by the randomly close packed particles, which themselves are filling larger interstitial spaces.

Figure 5:
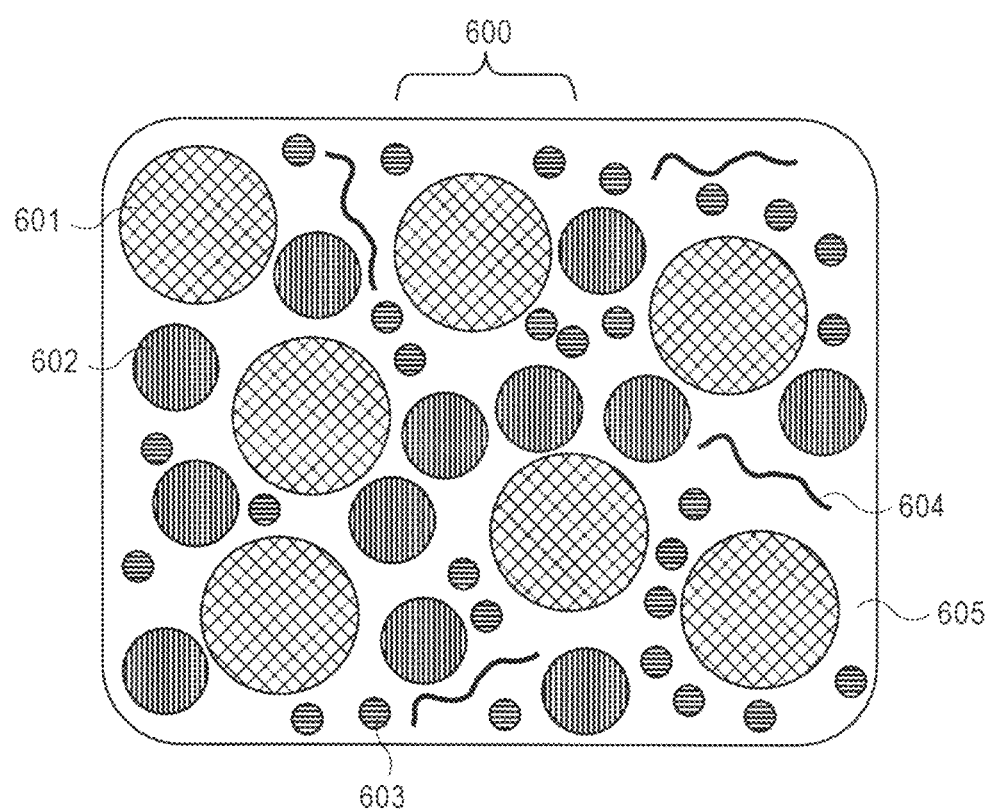
FIG. 5 illustrates the distribution of particles in a representative metal paste, according to an embodiment of the present disclosure.

A schematic representation of this packing scheme can be seen in FIG. 5. FIG. 5 illustrates the distribution of particles in a representative metal paste, which includes particles optimally dispersed in a liquid state. FIG. 5 shows an item 600 comprising wet metal paste with well dispersed large population particles 601, medium population particles 602, small population particles 603 surrounded by binder 604 and solvent 605. Any of the solvents and binders described herein for use in a metal paste can be employed. The metal pastes can be employed in an additive manufacturing tool, which deposits the metal paste and processes it in a layer-wise fashion. Any of the additive manufacturing methods described herein, such as the method illustrated and described with respect to FIG. 4 above, can be employed for forming parts from the metal pastes.

In some embodiments of the present disclosure, there are three populations of particles with distinct particle size distributions and D50. Example characteristics of a chosen formula include the set ratios between the sizes of neighboring populations and the relative fractional composition of populations with respect to the total metal. In general, the size and fractional ratios, described herein in the form "size" ("fraction of total metal" , "composition"), are defined by the D50 and a volumetric percentage of the total metals content of a paste (excluding non-metallic components such as solvent and binder). The selected populations of metal particles are mixed with solvent and other organic additives to form a metal paste, which can then be used in an additive manufacturing technique as described herein. The various populations are described by their relative size, such that for a metal paste comprising three differently sized populations, the populations could be called large, medium, and small. This is not intended to limit these populations to any specific size ranges, but to instead indicate that there is a set ratio between the D50 of each population which is not equal to 1.

In some embodiments, the particles described as the large population have D50 selected from the range of 10-40 µm, or 15-35 µm, or 20-30 µm. In related embodiments, the particles described as the medium population have D50 selected from the range of 2-10 µm, or 3-8 µm, or 4-6 µm. In related embodiments, the particles described as the small population have D50 selected from the range of 0.1-1 µm, 0.2-0.8 µm, or 0.3-0.6 µm. In other embodiments, the ratios between the D50 of populations of particles described as small:medium:large are approximately 1:6:30, or 1:8:45, or 1:10:60, or 1:14:100, or any ratio between these ratios, such as any ratio ranging from 1:6:30 to 1:14:100.

The composition of metals for each population is a property that can significantly affect the final product. For example, the metal particles in many embodiments are chosen to sinter, reactively or thermally, together to form a solid metal part of a specific desired alloy, such as stainless steel grade 316 (S31600 in UNS), which has a narrowly defined range of compositions. In the described additive manufacturing process, a thermal sintering processing may involve excursions to temperatures from 500° C.-1500° C., or 700° C.-1300° C., or 900° C.-1100° C. for times from 1-12, 2-9, or 3-6 hours in an atmosphere which is appropriate for the metallic composition of the part in some embodiments. During this thermal processing, sintering may be enhanced by chemical gradients established by the compositions and positions of the constituent particle populations, or sintering may be driven primarily by the ejection of pores out of free surfaces and the concomitant reduction in total surface area and curvature.

The metal pastes can comprise a variety of different combinations of particles sizes and materials, as described herein. In an example of the present disclosure, the metal paste composes three populations of metal particles: 50% large particles (e.g. D50 of 30 µm, composition of steel alloy 316), 25% medium particles (e.g. D50 of 5 on composition of iron), and 2 f% small particles (e,g. D50 of 500 nm, composition of nickel). Several other example embodiments are listed in Tables 1A to 1C, discussed below; the selection of metal particle population size, composition and fraction are examples of variables which influence processing performance and final part properties. However, the possible parameter space vast such that effective formulae cannot be found through routine optimization. Instead, the following principles guide the selection of each property of each population and the formulation that, optimizes their combined performance in, an additive manufacturing application, which involves sintering of green bodies.

Design Rules for Metal Particle Population Compositions

During sintering, elemental diffusion can both remove porosity and more evenly distribute the elements distributed amongst the different populations, which can lead to enhanced properties (e.g. a metal part with separate 10 µm regions of copper and tin is not as mechanically strong or hard as an alloy wherein each 10 µm region has an even distribution of copper and tin). The time and energy that can be used to diffuse elements to attain a sufficiently homogeneous microstructure is lamely determined by the desired distance that elements are to diffuse, and so it is advantageous to select the largest population such that its composition is closest to that of the desired final part composition. For example, to produce a part with 92% copper and 8% tin, it would be advantageous to select a large population of 60% (20 µm, 96% copper, 4% tin) with a medium population of 20% (4 µm, pure copper) and a small population of 20% (500 nm, 70% copper, 30% tin).

Additionally, composition of the smallest population particles is selected such that their reactivity is as low as possible given the desired total composition. High reactivity in small populations is problematic because the smallest population is generally less than 1 µm in diameter and many materials have enhanced rates of oxidation at that size scale. Additionally, many final metal parts benefit from having a specific distribution of elements on a scale below 10 µm, such as well dispersed chromium regions smaller than 1 µm.

Finally, the composition of the medium particles is chosen to balance the composition of the total metal formulation. Due to its larger size it is less prone to oxidation, and as such it can act as a source of more reactive elements for the larger particles and also as a channel between the large and small particle populations.

As per the aforementioned design rules, the large particles have a composition (96% copper, 4% tin) which is close to the final desired composition (92% copper, 8% tin), and the small particles have a tin-rich composition, which lowers their reactivity with air substantially. The medium population's composition of pure copper enables its role as a channel. During the sintering process, tin would be able to diffuse from the small population particles to the medium population particles rapidly, due to the high chemical potential from the disparate tin concentrations in the two populations. Then, on a longer time scale, tin would further diffuse into the larger population particles, eventually homogenizing the composition across the whole metal microstructure as all particles coalesce into larger grains.

Composition of Large Population Particles

The large population particles are chosen to have compositions which are similar to desired known metallurgical compositions, though they can be produced with an intentional elemental deficit. These large population particle compositions are chosen such that the average composition of all three particle populations is equal to that of the desired metallurgical composition. In other embodiments, the large population particles have the exact desired composition, and in these embodiments the small and medium population particle compositions have an average composition similar to the composition of the large particle population.

Known metallurgical compositions which are most useful in an additive manufacturing applications of the present disclosure include, but are not limited to, the following fall percentages given on a mass basis):

Iron based alloys, comprising at least one of the following alloying elements with composition within the described ranges: carbon in the ranges from 0.01-0.4%, or 0.4-0.6%, or 0.7-1.5%; aluminum in the ranges from 0.5-1.5%, boron in the ranges from 0.0005-0.003%, chromium in the ranges from 0.25-20%, cobalt in the ranges from 0.01-8%, copper in the ranges from 0.1-2%, manganese in the ranges from 0.25-1%, molybdenum in the ranges from 0.2-5%, nickel in the ranges from 0.5-20%, phosphorus in the ranges from 0.01-0.4%, silicon in the ranges from 0.01-2%, titanium in the ranges from 0.01-0.4%, tungsten in the ranges from 0.01-0.4%, vanadium in the ranges from 0.1-2%, and zirconium in the ranges from 0.01-0.4%, Nickel based alloys, comprising at least one of the folimmino alloying elements with composition within the described ranges: carbon in the ranoes from 0.01-0.4; aluminum in the ranges from 0.1-8%, boron in the ranges from 0.001-0.2%, chromium in the ranges from 1-30%, cobalt in the ranges from 0.5-20%, copper in the ranges from 0.1-5%, manganese in the ranges from 0.1-1%, molybdenum in the ranges from 0.1-10%, silicon in the ranges from 0.01-1%, titanium in the ranoes from 0.1-4%. tungsten in the ranges from 0.1-10%, niobium in the ranges from 0.1-6%, iron in the ranges from 0.1-2.0%, rhenium in the ranges from 0.1-7%, hafnium in the ranges from 0.01-0.1%, and zirconium in the ranges from 0.01-0.1%.

Copper based alloys, comprising at least one of the following alloying elements with composition within the described ranges: aluminum in the ranges from 0.1-10%, iron in the ranges from 0.01-2%, beryllium in the ranges from 0.01-2%, chromium in the ranges from 0.1-5%, zinc in the ranges from 1-40%, tin in the ranges from 0.1-20%, manganese in the ranges from 0.01-1%, lead in the ranges from 0.1-5%, nickel in the ranges from 0.1-30%, phosphorus in the ranges from 0.01-0, 2%, silicon in the ranges from 0.1-5%, tellurium in the ranges from 0,01-0.5%, and zirconium in the ranges from 0.01-0.4%.

Aluminum alloys, comprising at least one of the following alloying elements with composition within the described ranges: iron in the range from 0.01-5%; tin in the ranges from 0.1-10%, bismuth in the ranges from 0.01-0.5%, lead in the ranges from 0.01-0.5%, chromium in the ranges from 0.01-2%, copper in the ranges from 0.1-10%, manganese in the ranges from 0.1-5%, magnesium in the ranges from 0.1-10%, nickel in the ranges from 0.5-10%, silicon in the ranges from 0.5-14%, titanium in the ranges from 0.01-0.4%, vanadium in the ranges from 0.1-1%, and zinc in the ranges from 0.1-10%.

Composition of Small and Medium Population Particles

Small particle populations which resist oxidation are commonly chosen from the group of materials termed "intermetallic compounds". Intermetallic compounds are a sub-class of metal alloys wherein there is only a single specific composition which leads to long-range order and crystallinity, such as $Cu_3Sn$, NiAl, or $MgCu_2$. Inclusion of intermetallics is an effective means of inserting high concentrations of desired elements evenly throughout the green body in additive manufacturing applications, since their inertness (lack of chemical reactivity) mitigates oxide formation during sintering.

Intermetallic compounds that can be processed and used in metal paste formulations for the described additive manufacturing technique include ordered alloy phases formed between the following pairs of elements: Fe—V, Fe—Mn, Fe—Mo, Fe—Cr, Fe—Ni, Fe—Al, Fe—Cu, Fe—B, Fe—Si, Fe—W, Fe—P, Fe—Ti, Fe—Zr, Ni—B, Ni—Cr, Ni—Co, Ni—Mn Ni—Mo, Ni—Si, Ni—Ti, Ni—W, Ni—Zr, Cu—Be, Cu—Cr, Cu—Mn, Cu—P, Cu—B, Cu—Si, Cu—Te, Al—Sn, Al—Si, Al—P, Al—B, and Al—Ti. The advantage of utilizing intermetallic compositions is specifically in the ability to include alloying elements that would generally be too reactive in their pure forms yet when combined with another normally reactive or inert alloying element they can form stable compounds which can be formed into small particle populations through processes such as mechanical milling, grinding, or attrition.

Additionally, a limited set of pure elements are particularly advantageous as the composition of the small or medium particle population, due to their inertness even in an unalloyed (pure) state, such as chromium, molybdenum, nickel, tantalum, zirconium, niobium, tungsten, silicon, boron, and cobalt.

Finally, formulations with the small or medium population particles comprising a set of alloys is advantageous in this application, chosen such that the majority of the alloy is the desired element and a minority of the alloys an element which decreases reactivity upon alloying with the desired element. Examples of pairs of elements meeting this criterion include iron with chromium addition, copper with silver addition, and aluminum with silicon addition. This condition can be somewhat relaxed specifically for the medium particle population, due to their larger size and thus lower propensity for oxidation.

In addition to the composition, the sphericity (defined as the ratio between the smallest and largest dimension of a particle, such that a sphere has the maximal sphericity of 1) of particles in a group controls how easily particles can slip past one another and find thermodynamically favorable positions in interstices, leading to tighter packing. This property is advantageous in the medium and small sized populations, because it can allow the medium and small sized population particles to efficiently pack into the interstices of the larger population particles. However, since the smaller and medium populations act as an internal lubricant, the sphericity of the large population is not critical, and as such a variety of particle shapes can be selected for this population.

In an embodiment, relative ratios of the various size groups depend on the shape of the particles. While the geometric modeling of perfect spheres implies some ratios, it has been found that the optimal amount (e.g., by weight or fractional distribution) of the different sized groups also depends strongly on particle shape. Particularly, while large sized populations are the vast majority of close packed trimodal compositions with ideal sphericity of 1 for all particles, the fraction of large sized populations can be reduced when sphericity is less than 1.

Composition of Formulations of Mixed Populations of Particles

Several examples of metal particle population mixtures following the above described design rules are provided in Tables 1A to 1C (Formulas A-C). While the average compositions of these mixtures are designed to approximate known metal compositions, the particular mixtures are optimized for maximal sintering in an additive manufacturing application. For a given target composition, there are several possible mixtures of particle sizes and compositions which obey the aforementioned design rules, though distinct embodiments may specifically prioritize one rule over another as is most advantageous for optimizing mechanical properties of a part produced with such a formulation by an additive manufacturing process.

TABLE 1A

| Formula A | Fe | Cr | Mo | Ni | Mn | Si |
|---|---|---|---|---|---|---|
| Approximate Target Alloy (wt %) | 70 | 13 | 2 | 12 | 2 | 1 |
| Large Particle Size (D50) (μm) | 24 | | | | | |
| Large Particle Composition (wt %) | 82.5 | 6 | 2.7 | 4 | 3.2 | 1.6 |
| Large Particle Fraction (vol %) | 63 | | | | | |
| Medium Particle Size (D50) (μm) | 4 | | | | | |
| Medium Particle Composition (wt %) | 66 | 17 | 0 | 17 | 0 | 0 |
| Medium Particle Fraction (vol %) | 27 | | | | | |
| Small Particle Size (D50) (μm) | 0.6 | | | | | |
| Small Particle Composition (wt %) | 0 | 50 | 0 | 50 | 0 | 0 |
| Small Particle Fraction (vol %) | 10 | | | | | |

TABLE 1B

| Formula B | N | Co | Nb | Mo | Ti | Al | Cr | Fe |
|---|---|---|---|---|---|---|---|---|
| Approximate Target Alloy | 51 | 1 | 5 | 3 | 1 | 1 | 20 | 18 |
| Large Particle Size (D50) (μm) | 20 | | | | | | | |
| Large Particle Composition (wt %) | 53.9 | 1.7 | 9 | 5 | 1.7 | 1.7 | 15 | 12 |
| Large Particle Fraction (vol %) | 60 | | | | | | | |
| Medium Particle Size (D50) (μm) | 3 | | | | | | | |
| Medium Particle Composition (wt %) | 57 | 0 | 0 | 0 | 0 | 0 | 0 | 43 |
| Medium Particle Fraction (vol %) | 25 | | | | | | | |
| Small Particle Size (D50) (μm) | 0.5 | | | | | | | |
| Small Particle Composition (wt %) | 30 | 0 | 0 | 0 | 0 | 0 | 70 | 0 |
| Small Particle Fraction (vol %) | 15 | | | | | | | |

TABLE 1C

| Formula C | Cu | Pb | Sn |
|---|---|---|---|
| Approximate Target Alloy | 80 | 10 | 10 |
| Large Particle Size (050) (μm) | 18 | | |
| Large Particle Composition (wt %) | 90 | 5 | 5 |
| Large Particle Fraction (vol %) | 60 | | |
| Medium Particle Size (D50) (μm) | 3 | | |
| Medium Particle Composition (wt %) | 90 | 0 | 10 |
| Medium Particle Fraction (vol %) | 25 | | |
| Small Particle Size (D50) (μm) | 0.5 | | |
| Small Particle Composition (wt %) | 20 | 50 | 30 |
| Small Particle Fraction (vol %) | 15 | | |

Non-metal Components of Additive Manufacturing Paste

In several embodiments, the non-metal constituents of the metal paste comprise three groups of components combined in percentages given as a fraction of the whole paste weight. In one, embodiment, the formulation is a paste with greater than 87% metal particle, less than 2 wt % binder, less than 1 wt % dispersant, and less than 10 wt % solvent. In another embodiment, the metal mixture is formulated into a filamentary form comprising greater than 86% metal particles, less than 10 wt % binder, less than 3 wt % dispersant, less than 1 wt % solvent. In further embodiments, the metal mixtures are formulated into printable materials with compositions comprising greater than 88% metal powder, less than 5 wt % binder, less then 5 wt % solvent, and less than 2 wt % dispersant. Each of these elements can be a pure compound or more commonly a mixture of compounds chosen for superior performance during the printing and annealing process of an additive manufacturing technique.

Additional Embodiments

In an embodiment, the metal pastes of the present disclosure can comprise a vehicle and a metal powder. The vehicle comprises at least one solvent and at least one polymeric binder. Any suitable solvents and binders can be employed, including any of the solvents and binders described herein. The metal powder comprises metal scaffold particles and metal infiltrant particles. The metal scaffold particles comprise a structural metal and can be any of the scaffold particles, large particles or medium particles described herein. The infiltrant particles can be any of the infiltrant particles, small particles or medium particles described herein. In an embodiment, the metal infiltrant particles have a D50 particle size of about ¼ or less of the D50 particle size of the metal scaffold particles, such as about ⅕ or less of the D50 particle size of the metal scaffold particles, such that the metal infiltrant particles primarily position in interstitial spaces between the metal scaffold particles.

One, two three or more different D50 size populations of scaffolding particles can be employed in combination with one, two, three or more different D50 size populations of infiltrant particles. In an embodiment, where multiple D50 population sizes are employed for either or both of the scaffolding or infiltrant particles, the largest population of metal infiltrant particles can have a D50 particle size of about ¼ or less, such as about ⅕ or less, of the D50 particle size of the largest population of metal scaffold particles. Any of the other ingredients described herein for use in the metal pastes of the present disclosure can also be employed in any of the concentration ranges or ratios as described herein for those ingredients.

In an embodiment, the metal powders comprise three or more materials, including particles comprising iron, particles comprising nickel, and particles comprising copper. The particles comprising iron are in at least two different size populations, a large population with a D50 of about 10 um to about 20 um, such as 15 um; and a small population with a D50 of about 1 um to about 10 um, such as 5 um. The small population of iron particles has a D50 that is at least 5 um smaller than the D50 of the large population such as 5 um to 15 um smaller.

The composition of the small iron population can comprise about 70% by weight to 100% by weight Fe, such as about 90% by weight to 100% by weight Fe, such as about 95% or about 98% to about 99.99% by weight Fe, or about 99% to about 99.95, or about 99.5% to about 99.95% Fe, such as about 99.8% by weight Fe. One or more additional materials can be included in the composition of the small iron population, including any of the materials described herein for use in the infiltrants small particles or medium particles. In one example, the small iron population comprises about 2% to about 0.05% carbon by weight, such as about 1% to about 0.1% carbon, or about 0.6% to about 0.2% carbon by weight. For example, the small iron particles can comprise about 0.2% carbon by weight and about 99.8% by weight Fe.

The composition of the large iron population can comprise about 70% by weight to 100% by weight Fe, such as about 90% by weight to 100% by weight Fe, such as about 95% or about 98% to about 99.99% by weight Fe, or about 99% to about 99.95% Fe, such as about 99.3% by weight Fe. In an embodiment, the large iron population can have a lower concentration of iron than the small iror population. One or more additional materials an be included in the large iron population including any of the materials described herein for use in the scaffold materials, medium particles or large particles. In one example, the large iron population has a composition of about 99.3% by weight Fe and about 0.7% by weight C.

The particles comprising nickel can have a nickel concentration of 95% by weight nickel or more, such as 98%, 99%, 99.5%, 99.8%, 99.9% or 100% Ni and are also in two populations, a large population and a small population. The small population of nickel particles has a D50 ranging from about 400 nm to about 800 nm such as about 500 nm to about 700 nm, or about 600 nm. The large population of nickel particles has a D50 of about 1 um to about 5 um, such as about 2 um to about 4 um or about 3 um. In an embodiment, the morphology of the large population of nickel particles can be described as "filamentary". Such filamentary particles ale generally known in the art. As described herein, the D50 can be as measured by a Beckman Coulter LS230.

The copper particles can have a copper concentration ranging from about 90% by weight copper or more, such as about 95% by weight, 98%, 99%, 99.5%, or about 99.7% by weight copper. One or more additional materials can be included in the copper particles, including any of the materials described herein for use in the infiltrants, small particles or medium particles. In one example, oxygen can be included in the copper particles at concentrations of, for example 1% or less, such as about 0.5% by weight or less. For example, the copper particles can comprise about 0.3% O and about 99.7% by weight Cu. The D50 of the copper particles can range from about 200 nm to about 600 nm, such as about 300 nm to about 500 nm, such as about 400 nm.

In a specific example, the paste compositions of the present disclosure can include metals powders comprising iron, nickel and copper particles, as follows: The large iron particles have a D50 of about 15 um and a composition of about 99.8% Fe by weight and about 0.2% C by weight and the small iron particles have a D50 of about 5 um and a composition of about 99.3% Fe by weight and about 0.7% C by weight. Both the large and small nickel particles comprise greater than 99.9% Ni (e.g., 100% Ni) by weight and are also in two populations, a small population with a D50 of about 600 nm, and a large population with a D50 of about 3 um. The large Ni population has a filamentary morphology. The copper particles have a D50 of about 400 nm and are about 99.7% Cu and about 0.3% O by weight.

The relative ratios, by weight, of the particles (large iron:small iron:large nickel:small nickel:copper) can be, for example, about 5:10:2:1:1, or about 10:5:2:1:1 or about 3:12:1:2:4, or about 3:12:1:2:1 or about 3:12:1:2:2. As percentages by weight, the relative amounts can range, for example, from about 15% to about 60%, such as about 25% to about 55% large iron particles, about 60% to about 15%, such as about 55% to about 25% small iron particles, about 2% to about 20% such as about 5% to 12% large nickel, about 2% to 20%, such as about 5% to 12% small nickel and about 2% to about 20%, such as about 5% to about 12% copper. Other suitable weight ratios or percentages can also be employed. The relative amounts of each type of particle can be modified as desired to provide a suitable degree of hardness and/or to allow for reduced sintering temperatures. The large iron, small iron and large nickel particles can be considered metal scaffold particles and the small nickel and copper particles can be considered infiltrant particles However, it may be possible for the large nickel particles to act as infiltrants relative to the large iron particles. In embodiments, it may also be possible for the small iron particles to be considered infiltrants depending on what other elements they include and their relative size to the scaffold particles.

To further increase hardness of the sintered composition, ultrahard components can be added. In an embodiment, the ultrahard components are added during the mixing of the paste. For example, the ultrahard component can be added to the metal paste mixture at about 1% to about 5% by volume of the mixture. The ultrahard components can be selected from the following: titanium boride, titanium carbide, tungsten carbide, silicon nitride, zirconium carbide, vanadium carbide, silicon oxide, aluminum oxide, yttrium oxide, and combinations thereof. The D50 of the ultrahard compounds can range from about 10 nm to about 500 nm, such as about 10 nm to about 100 nm, or about 10 nm to about 50 nm.

In addition to or instead of adding ultrahard components during mixing of the paste, the ultrahard components can be added to the large iron particles prior to mixing. In an embodiment, the ultrahard component can be added to the large iron particles prior to mixing, such as by homogeneously distributing the ultrahard component inside or throughout the large iron particles. As an example, the ultrahard particles can be mixed into the large iron particles by high energy ball milling to form a ultrahard particle—large soft particle conglomerate. Any of the large iron particles or any of the other scaffold particles described herein can include ultrahard particles in an amount ranging from about 0.5% to about 10% by weight. In an example, the large particles can comprise about 95% by weight Fe and about 5% by weight of an ultrahard component. Any of the ultrahard components described herein can be included in the iron particles or other scaffold particles. The D50 of the ultrahard compounds for this embodiment can range from about 10 nm to about 500 nm, such as about 10 nm to about 100 nm, or about 10 nm to about 50 nm.

Any suitable methods described herein can be employed to make the pastes described in these additional embodiments. For instance, as described herein, a layer of metal paste can be deposited onto a substrate in a desired shape, dried, optionally shaped by a laser scribing, and sintered with energy input. The process can be repeated until the final desired shape is formed from stacking a plurality of the individual layers. In an embodiment, the sintering can be performed after each repetition of depositing a layer, drying and shaping the layer. Alternatively, the sintering process can be postponed so that it is carried out only after several layers have been deposited, dried and optionally shaped. For example, the sintering process can be carried out only after all layers of a part have been deposited, dried and optionally shaped. Assembly and post-anneal processes can also be carried out as described herein.

EXAMPLES

Materials used in the following examples include the following:
"Terpineol" is the solvent alpha-terpineol greater than 99% purity from Sigma-Aldrich
"MS" is the solvent mineral spirits, greater than 99% purity from Sigma-Aldrich
"PC" is the solvent propylene carbonate, greater than 99% purity from Sigma-Aldrich
"OA" is the lubricant oleic acid, greater than 95% purity from Sigma-Aldrich
"S54k" is the dispersant Solsperse 9000 from Lubrizol
"PAA" is the polymer poly(acrylic acid), MW=5000, from Fisher Scientific
"EC10" is the binder ethyl cellulose 10, industrial grade from Dow Chemical
"QPAC40" is the binder poly(propylene carbonate) 40, industrial grade from Empower Materials
"Cu1" particles are copper particles, with a D50=800 nm and a D90=2 μm
"Cu2" particles are copper nanoparticles, produced by chemical precipitation, with a D50=200 nm and a D90=500nn
"Fe1" particles are low carbon steel particles, with a D50=4 μm and a D90=8 μm
"Fe2" particles are iron nanoparticles, produced by chemical precipitation, with a D50=250 nm and a D90=400 nm
"Ni1" particles are nickel particles, produced by chemical precipitation, with a D50=500 nm and a D90=1 μm "Ni2" particles are nickel particles, produced by chemical precipitation, with a D50=100 nm and a D90=400 nm "FeCo1" particles are low carbon steel particles, with a D50=4 μm and a D90=8 μm. These particles have a 25 nm thick shell comprising cobalt produced by chemical precipitation.

"MWCNT" are multiwall carbon nanotubes, with a tube diameter of 30 nm and average length of 20 μm.

Example 1

5 g of solvent terpineol are mixed with 0.5 g lubricant OA, 0.1 g polymer PAA, and 0.4 g binder EC10 in a Thinky ARE-310 planetary mixer. To this solution, is added the following metal powders: 67 g Fe1, 2 g Fe2, and 25 g Ni2, The paste is then wet in the planetary mixer prior to dispersion using an Exakt Technologies three roll mill.

Example 2

9 g of solvent terpineol are mixed with 0.5 g lubricant OA, 0.1 g polymer PAA, and 0.4 g binder EC10 in a Thinky ARE-310 planetary mixer. To this solution is added the following metal powders: 60 g Fe1, 15 g Cu2, and 15 g Ni2. The paste is then wet in the planetary mixer prior to dispersion using an Exakt Technologies three roll mill.

Example 3

9 g of solvent PC are mixed with 0.5 g dispersant S54k, 0.1 g polymer PAA, and 0.4 g binder QPAC40 in a Thinky ARE-310 planetary mixer. To this solution is added the following metal powders; 60 g Cu1, 14 g Cu2 and 15 g Ni 2. Additionally, 1 g MWCNT is added to the mixture. The paste is then wet in the planetary mixer prior to dispersion using an Exakt Technologies three roll mill.

Example 4

7 g of solvent terpineol are mixed with 0.5 g lubricant OA, 0.1 g polymer PAA, and 0.4 g binder EC10 in a Thinky ARE-310 planetary mixer. To this solution is added the following metal powders: 62 g Ni1, 14 g Fe2, 10g Cu2, and 5 g Ni2. Additionally, 1 g MWCNT is added to the mixture. The paste is then wet in the planetary mixer prior to dispersion using an Exakt Technologies three roll mill.

Example 5

7 g of solvent terpineol are mixed with 0.5 g lubricant OA, 0.1 g polymer PAA, and 0.4 g binder EC10 in a Thinky ARE-310 planetary mixer. To this solution is added the following metal powders: 63 g FeCo1, 5 g Fe2, 5g Cu2, 5 g Ni1, and 13 g Ni2, Additionally, 1 g MWCNT is added to the mixture. The paste is then wet in the planetary mixer prior to dispersion using an Exakt Technologies three roll mill.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein the term "about" indicates that the value listed may be somewhat altered, as long as the alteration does not result in nonconformance of the process or structure to the illustrated embodiment. Finally, "exemplary" indicates the description is used as an example, rather than it plying that it is an ideal.

Other embodiments of the present teachings will be apparent to those skilled in the art from consideration of the specification and practice of the present teachings disclosed herein. It is intended that the specification and examples be considered as exemplary only with a true scope and spirit of the present teachings being indicated by the following claims.

What is claimed is:

1. A metal paste for use in the layerwise growth of metal structures, comprising:
   a vehicle comprising at least a solvent and a polymeric binder;
   metal scaffold particles comprising greater than 99.5 wt % iron and less than 0.5 wt % carbon, the metal scaffold particles having a D50 particle size; and
   metal infiltrant particles with a D50 particle size of less than ⅕ of the D50 particle size of the metal scaffold particles, such that the metal infiltrant particles primarily position in interstitial spaces between the metal scaffold particles.

2. The metal paste of claim 1 wherein the metal infiltrant particles comprise members selected from the group consisting of aluminum, boron, carbon, chromium, cobalt, copper, iron, magnesium, manganese, molybdenum, nickel, phosphorus, silicon, tin, titanium, tungsten, vanadium and zinc.

3. The metal paste of claim 1 wherein the metal infiltrant particles comprise copper.

4. The metal paste of claim 1 wherein the metal infiltrant particles comprise nickel.

5. The metal paste of claim 1 wherein the metal infiltrant particles comprise a first population of particles comprising copper and a second population of particles comprising nickel.

6. The metal paste of claim 1, wherein:
   a. the vehicle is at a concentration of 3-10 wt % of the metal paste;
   b. the metal scaffold particles having a D50 particle size of between 1 μm and 8 μm and being at a concentration of between 50-70 wt % of the metal paste;
   c. the metal infiltrant particles comprise nickel, the metal infiltrant particles being at a concentration of 10-30 wt % of the metal paste.

7. The metal paste of claim 6, further comprising a second population of infiltrant particles comprising copper.

8. The metal paste of claim 7, wherein the metal scaffold particles consist of greater than 99.5 wt % iron and less than 0.5 wt % carbon, and the metal infiltrant particles consist essentially of nickel.

9. The metal paste of claim 1 wherein the vehicle comprises a solvent selected from the group consisting of water, ethylene glycol, diethylene glycol, diethylene glycol monobutyl ether, triethylene glycol monobutyl ether, methanol, ethanol, propanol, butanol, pentanol, hexanol, heptanol, octanol, terpineol, texanol butyl ester, mineral spirits, propylene carbonate, pentane, hexane, cyclohexane, heptane, octane, nonane, decane, undecane, dodecane, tridecane, tetradecane, toluene, benzene, xylene, mesitylene, tetrahydrofuran, ethanolamine and N-methylpyrrolidone, dichloromethane, toluene, ketones, dimethylacetamide, acetone, methyl ethyl ketone, cyclohexanone, methyl acetate and n-butyl acetate.

10. The metal paste of claim 1 wherein the vehicle comprises at least one binder selected from the group consisting of poly(ethyelene oxide); ethyl cellulose; methyl cellulose; agar; hydroxyethyl cellulose; nitrocellulose; polymethylmethacrylate, polystyrene, polyester, methylacrylate, ethylacrylate, butylacrylate, acrylonitrile copolymer, maleic acid, and maleic acid ester; polyvinyl acetate; polyethylene; polypropylene; polyvinylbutyral; poly(carbonate), poly(acrylic acid); rosin; modified rosin; terpene resin; phenolic resin; paraffin wax, ethylene vinyl alcohol, polycaprolactam, and combinations thereof.

11. A metal paste for use in the layerwise growth of metal structures, comprising:
 a vehicle comprising at least a solvent and a polymeric binder;
 metal scaffold particles comprising iron, the metal scaffold particles having a D50 particle size; and
 metal infiltrant particles with a D50 particle size of less than 1/5 of the D50 particle size of the metal scaffold particles, such that the metal infiltrant particles primarily position in interstitial spaces between the metal scaffold particles,
 wherein the metal scaffold particles have a D50 particle size of between 1 µm and 8 µm and the metal infiltrant particles have a D50 between 50 nm and 1 µm.

12. The metal paste of claim 11, wherein the metal scaffold particles comprise steel.

13. The metal paste of claim 11 wherein the metal infiltrant particles comprise members selected from the group consisting of aluminum, boron, carbon, chromium, cobalt, copper, iron, magnesium, manganese, molybdenum, nickel, phosphorus, silicon, tin, titanium, tungsten, vanadium and zinc.

14. The metal paste of claim 11 wherein the metal infiltrant particles comprise copper.

15. The metal paste of claim 11 wherein the metal infiltrant particles comprise nickel.

16. The metal paste of claim 11 wherein the metal infiltrant particles comprise a first population of particles comprising copper and a second population of particles comprising nickel.

17. The metal paste of claim 11 wherein the vehicle comprises at least one binder selected from the group consisting of poly(ethyelene oxide); ethyl cellulose; methyl cellulose; agar; hydroxyethyl cellulose; nitrocellulose; polymethylmethacrylate, polystyrene, polyester, methylacrylate, ethylacrylate, butylacrylate, acrylonitrile copolymer, maleic acid, and maleic acid ester; polyvinyl acetate; polyethylene; polypropylene; polyvinylbutyral; poly(carbonate), poly(acrylic acid); rosin; modified rosin; terpene resin; phenolic resin; paraffin wax, ethylene vinyl alcohol, polycaprolactam, and combinations thereof.

18. The metal paste of claim 17 wherein the vehicle comprises a solvent selected from the group consisting of water, ethylene glycol, diethylene glycol, diethylene glycol monobutyl ether, triethylene glycol monobutyl ether, methanol, ethanol, propanol, butanol, pentanol, hexanol, heptanol, octanol, terpineol, texanol butyl ester, mineral spirits, propylene carbonate, pentane, hexane, cyclohexane, heptane, octane, nonane, decane, undecane, dodecane, tridecane, tetradecane, toluene, benzene, xylene, mesitylene, tetrahydrofuran, ethanolamine and N-methylpyrrolidone, dichloromethane, toluene, ketones, dimethylacetamide, acetone, methyl ethyl ketone, cyclohexanone, methyl acetate and n-butyl acetate.

19. A metal paste for use in the layerwise growth of metal structures, comprising:
 a vehicle comprising at least a solvent and a polymeric binder;
 metal scaffold particles comprising steel, the metal scaffold particles having a D50 particle size; and
 metal infiltrant particles with a D50 particle size of less than 1/5 of the D50 particle size of the metal scaffold particles, such that the metal infiltrant particles primarily position in interstitial spaces between the metal scaffold particles, the metal infiltrant particles comprising a first population of particles comprising copper and a second population of particles comprising nickel.

20. The metal paste of claim 19, wherein the metal scaffold particles comprise a low carbon steel.

21. The metal paste of claim 19, wherein the metal scaffold particles comprise greater than 99.5 wt % iron and less than 0.5 wt % carbon.

* * * * *